United States Patent
Bao et al.

(10) Patent No.: US 11,647,480 B2
(45) Date of Patent: May 9, 2023

(54) POSITIONING WITH GEOGRAPHICALLY-SIMILAR ANCHORS INCLUDING A MOBILE ANCHOR

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/244,841

(22) Filed: Apr. 29, 2021

(65) Prior Publication Data

US 2022/0353843 A1    Nov. 3, 2022

(51) Int. Cl.
*H04W 64/00* (2009.01)
*H04W 76/14* (2018.01)
*H04W 72/56* (2023.01)

(52) U.S. Cl.
CPC ......... *H04W 64/003* (2013.01); *H04W 72/56* (2023.01); *H04W 76/14* (2018.02)

(58) Field of Classification Search
CPC .... H04W 64/003; H04W 72/10; H04W 76/14
USPC ...................................... 455/456.1
See application file for complete search history.

(56) References Cited

U.S. PATENT DOCUMENTS

| 2012/0071170 | A1* | 3/2012 | Cho ...................... | H04W 64/00 455/456.1 |
| 2016/0095092 | A1* | 3/2016 | Khoryaev ............... | H04W 4/50 370/329 |
| 2019/0239181 | A1* | 8/2019 | Gangakhedkar ...... | H04W 76/10 |
| 2020/0275403 | A1* | 8/2020 | Lee ........................ | H04L 5/0055 |

FOREIGN PATENT DOCUMENTS

WO    WO-2021030583 A1 *    2/2021    .......... G01S 5/0072

OTHER PUBLICATIONS

International Search Report and Written Opinion—PCT/US2022/020942—ISA/EPO—dated Jun. 30, 2022.

* cited by examiner

*Primary Examiner* — Hirdepal Singh
(74) *Attorney, Agent, or Firm* — Thien T. Nguyen

(57) ABSTRACT

A positioning method includes: identifying a plurality of anchor devices of an anchor group, including a first UE, based on a geographic similarity of the plurality of anchor devices, each of the plurality of anchor devices being capable of exchanging PRS with a second UE; and transmitting an anchor group message to the second UE, the anchor group message identifying the plurality of anchor devices and indicating a transient property of the anchor group.

26 Claims, 11 Drawing Sheets

POSITIONING WITH GEOGRAPHICALLY-SIMILAR ANCHORS INCLUDING A MOBILE ANCHOR

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a positioning entity includes: a transceiver; a memory; and a processor, communicatively coupled to the transceiver and the memory, configured to: identifying a plurality of anchor devices of an anchor group, including a first UE (user equipment), based on a geographic similarity of the plurality of anchor devices, each of the plurality of anchor devices being capable of exchanging PRS (positioning reference signal(s)) with a second UE; and transmit an anchor group message via the transceiver to the second UE, the anchor group message identifying the plurality of anchor devices and indicating a transient property of the anchor group.

Implementations of such a positioning entity may include one or more of the following features. The transient property of the anchor group is an expiration time of the anchor group. The processor is configured to determine the expiration time of the anchor group based on motion of the first UE relative to another member of the anchor group. The processor is configured to determine the expiration time of the anchor group based on a predicted time that the first UE and the other member of the anchor group will fail to meet at least one criterion for being considered to be geographically similar. The transient property of the anchor group is a mobility status of at least the first UE.

Also or alternatively, implementations of such a positioning entity may include one or more of the following features. The mobility status indicates whether the first UE is presently in motion. The mobility status indicates which of the plurality of anchor devices of the anchor group are presently stationary.

Also or alternatively, implementations of such a positioning entity may include one or more of the following features. The processor is further configured to: receive updated locations of the plurality of anchor devices of the anchor group; and at least one of: determine whether to modify membership of the anchor group based on the updated locations; or determine an updated transient property of the anchor group based on the updated locations and transmit the updated transient property via the transceiver to the second UE; or terminate the anchor group based on the updated locations.

In another embodiment, a positioning method includes: identifying a plurality of anchor devices of an anchor group, including a first UE, based on a geographic similarity of the plurality of anchor devices, each of the plurality of anchor devices being capable of exchanging PRS with a second UE; and transmitting an anchor group message to the second UE, the anchor group message identifying the plurality of anchor devices and indicating a transient property of the anchor group.

Implementations of such a positioning method may include one or more of the following features. The transient property of the anchor group is an expiration time of the anchor group. The positioning method includes determining the expiration time of the anchor group based on motion of the first UE relative to another member of the anchor group. Determining the expiration time includes determining the expiration time of the anchor group based on a predicted time that the first UE and the other member of the anchor group will fail to meet at least one criterion for being considered to be geographically similar.

Also or alternatively, implementations of such a positioning method may include one or more of the following features. The transient property of the anchor group is a mobility status of at least the first UE. The mobility status indicates whether the first UE is presently in motion. The mobility status indicates which of the plurality of anchor devices of the anchor group are presently stationary.

Also or alternatively, implementations of such a positioning method may include one or more of the following features. The positioning method includes: receiving updated locations of the plurality of anchor devices of the anchor group; and at least one of: determining whether to modify membership of the anchor group based on the updated locations; or determining an updated transient property of the anchor group based on the updated locations and transmitting the updated transient property to the second UE; or terminating the anchor group based on the updated locations.

In another embodiment, a first UE includes: a transceiver; a memory; and a processor, communicatively coupled to the transceiver and the memory, configured to: receive an anchor group message via the transceiver from a positioning entity, the anchor group message identifying a plurality of anchor devices of an anchor group including a second UE, each of the plurality of anchor devices being capable of exchanging PRS with the first UE, and the anchor group message indicating a transient property of the anchor group; receive a plurality of PRS from the plurality of anchor devices; measure one or more of the plurality of PRS to determine one or more PRS measurements; and transmit, via the transceiver to a network entity, a positioning measurement report including the one or more PRS measurements based on the transient property of the anchor group.

Implementations of such a first UE may include one or more of the following features. The one or more PRS measurements include two or more PRS measurements, and the processor is further configured to: determine a baseline measurement of the two or more PRS measurements based on relative mobility of each of the plurality of anchor devices corresponding to the two or more PRS measurements; and transmit the positioning measurement report with a first of the two or more PRS measurements being the baseline measurement and a second of the two or more PRS measurements being a differential measurement relative to the baseline measurement. The baseline measurement is of a first PRS, of the plurality of PRS, corresponding to a first anchor device of the plurality of anchor devices, and the processor is configured to determine the baseline measurement based on the first anchor device being stationary. The baseline measurement is of a first PRS, of the plurality of PRS, corresponding to a first anchor device of the plurality of anchor devices, and the processor is configured to determine the baseline measurement based on the first anchor device being more stationary than a second anchor device of the plurality of anchor devices corresponding to the differential measurement.

Also or alternatively, implementations of such a first UE may include one or more of the following features. The processor is configured to transmit the positioning measurement report including the one or more PRS measurements based on relative mobility of each of the plurality of anchor devices according to a priority protocol indicated in a priority message received via the transceiver. The processor is configured to make the one or more PRS measurements based on relative mobility of each of the plurality of anchor devices. The transient property is an expiration time and the processor is configured to transmit the positioning measurement report based on lack of passage of the expiration time.

In another embodiment, a PRS measurement reporting method includes: receiving, an anchor group message at a first UE from a positioning entity, the anchor group message identifying a plurality of anchor devices of an anchor group including a second UE, each of the plurality of anchor devices being capable of exchanging PRS with the first UE, and the anchor group message indicating a transient property of the anchor group; receiving, at the first UE, a plurality of PRS from the plurality of anchor devices; measuring, at the first UE, one or more of the plurality of PRS to determine one or more PRS measurements; and transmitting, from the first UE to a network entity, a positioning measurement report including the one or more PRS measurements based on the transient property of the anchor group.

Implementations of such a method may include one or more of the following features. The one or more PRS measurements include two or more PRS measurements, and the method includes determining a baseline measurement of the two or more PRS measurements based on relative mobility of each of the plurality of anchor devices corresponding to the two or more PRS measurements, and transmitting the positioning measurement report includes transmitting the positioning measurement report with a first of the two or more PRS measurements being the baseline measurement and a second of the two or more PRS measurements being a differential measurement relative to the baseline measurement. The baseline measurement is of a first PRS, of the plurality of PRS, corresponding to a first anchor device of the plurality of anchor devices, and determining the baseline measurement includes determining the baseline measurement based on the first anchor device being stationary. The baseline measurement is of a first PRS, of the plurality of PRS, corresponding to a first anchor device of the plurality of anchor devices, and determining the baseline measurement includes determining the baseline measurement based on the first anchor device being more stationary than a second anchor device of the plurality of anchor devices corresponding to the differential measurement.

Also or alternatively, implementations of such a method may include one or more of the following features. Transmitting the positioning measurement report includes transmitting the positioning measurement report including the one or more PRS measurements based on relative mobility of each of the plurality of anchor devices according to a priority protocol indicated in a priority message received by the first UE. Measuring one or more of the plurality of PRS includes measuring one or more of the plurality of PRS based on relative mobility of each of the plurality of anchor devices. The transient property is an expiration time and transmitting the positioning measurement report includes transmitting the positioning measurement report based on lack of passage of the expiration time.

DETAILED DESCRIPTION

Figure 1:
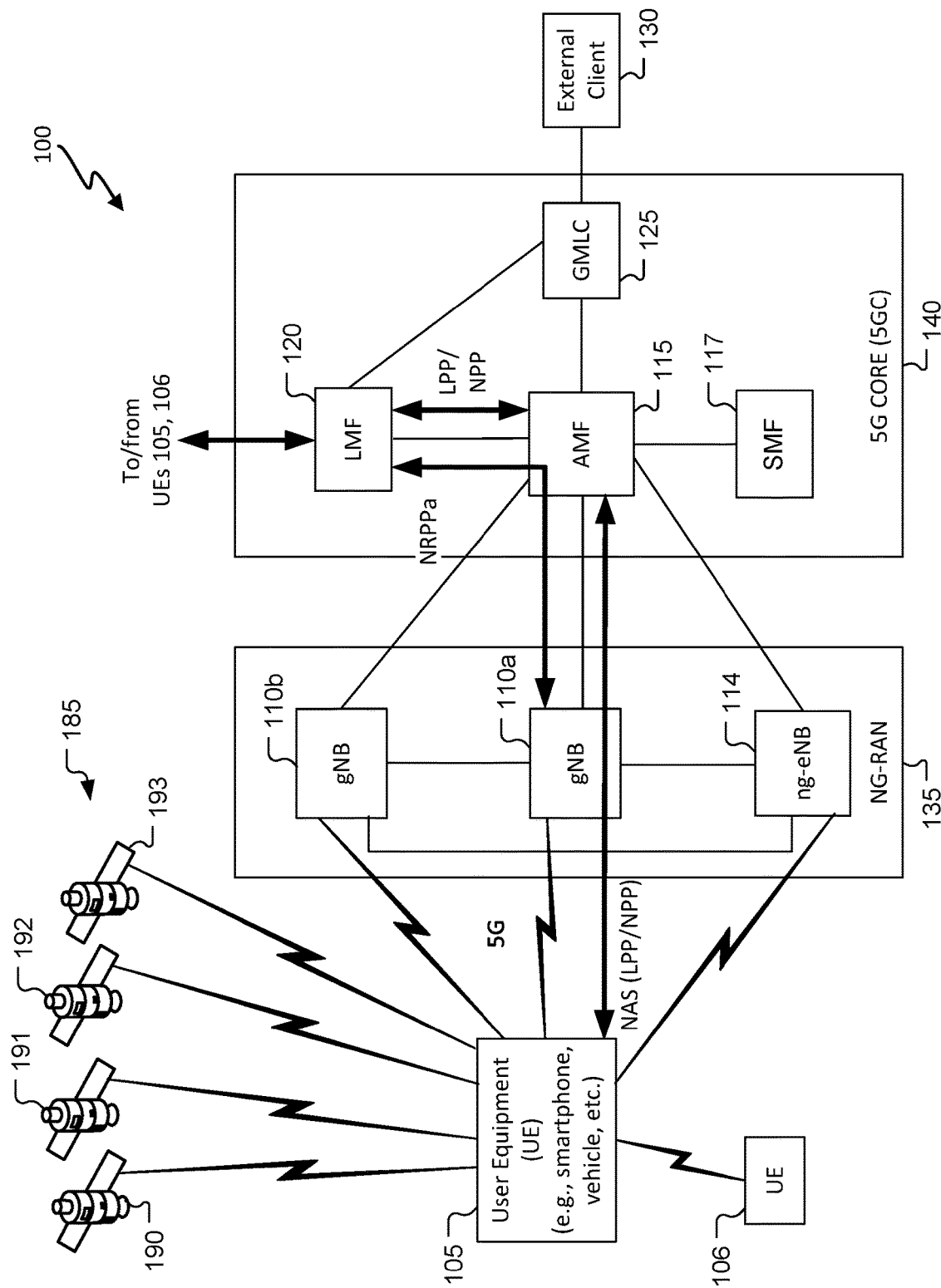
FIG. 1 is a simplified diagram of an example wireless communications system.

Techniques are discussed herein for grouping anchor devices (e.g., transmission/reception points, UEs, etc.) into groups and making and/or reporting a reduced number of PRS (positioning reference signal) measurements for each group. For example, a target UE may make and/or report a single measurement for a group of anchor devices (also called "anchors") that are located geographically similarly relative to the target UE (e.g., located within a threshold boundary or area, within a threshold of a line from the target UE, within a threshold height of each other, and/or within a threshold of a plane). For groups with one or more anchors, the group(s) have a transient property based on which the target UE makes and/or reports the PRS measurement(s) for the group. For example, the target UE may only make or report a PRS measurement for the group if an expiration time for the group has not passed. As another example, the target UE may base making and/or reporting of the PRS measurement(s) for a group on indicated mobility of one or more of the anchors in the group. The target UE may, for example, report a PRS measurement based on the group being within a threshold boundary for the group at the time of PRS measurement and/or reporting. The target UE may determine one or more baseline measurements and report one or more other PRS measurements as one or more differential measurements relative to the baseline measurement(s). The target UE may select the baseline measurement(s) based on the anchor(s) that is(are) the source(s) of the PRS corresponding to the baseline measurement(s) being stationary, or at least more stationary than the anchor(s) corresponding to the differential measurement(s). These are examples, and other examples may be implemented.

Items and/or techniques described herein may provide one or more of the following capabilities, as well as other capabilities not mentioned. PRS processing overhead may be reduced, e.g., by reporting a reduced set of (one or more) PRS measurements for a group of PRS sources. Positioning accuracy may be improved, e.g., by using processing resources for measurements from more geographically diverse PRS sources resulting in better GDOP (geometric dilution of precision). Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110*a*, 110*b*, 114 may be configured to communicate with the UE 105 via multiple carriers. Each of the BSs 110*a*, 110*b*, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least sometimes using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
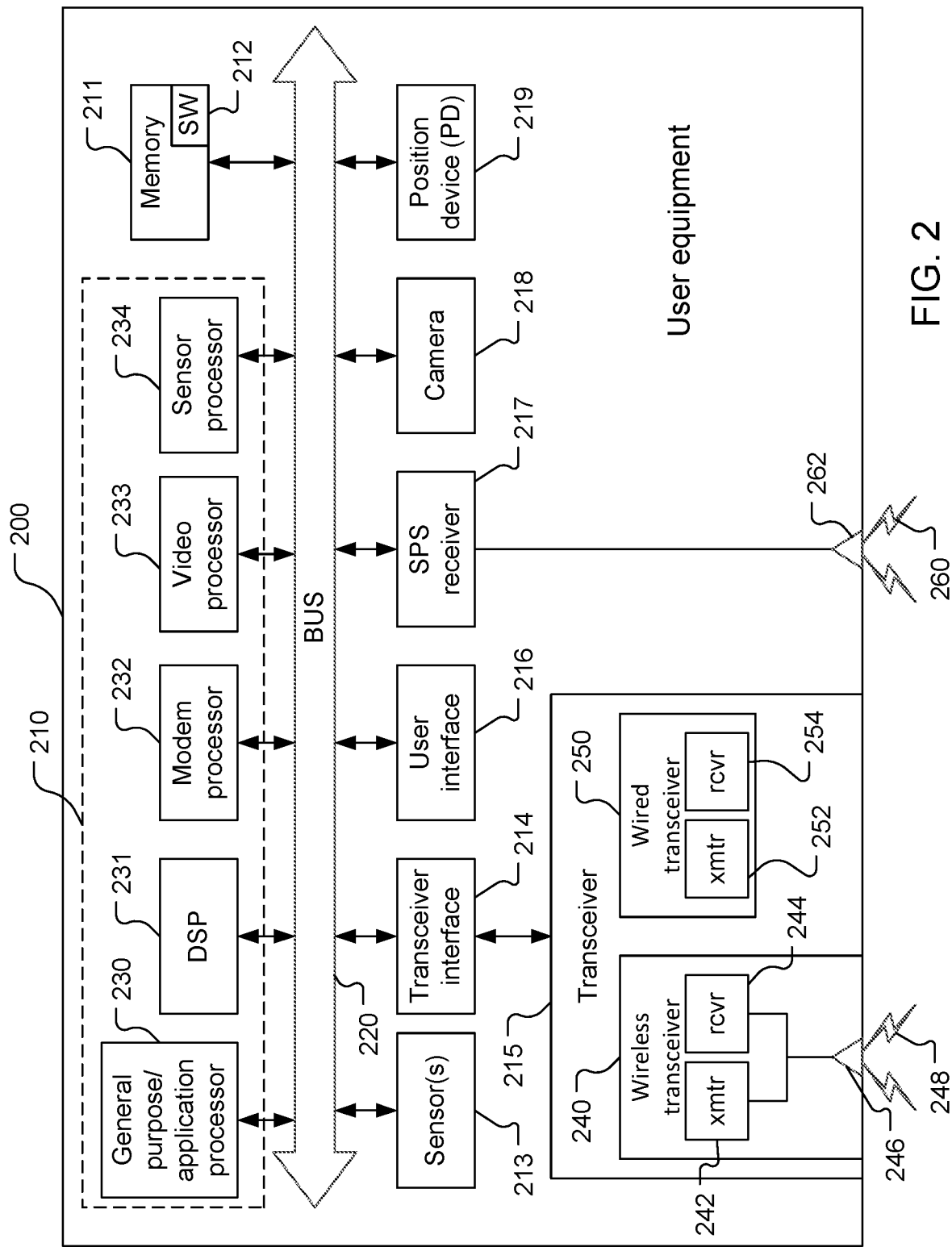
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
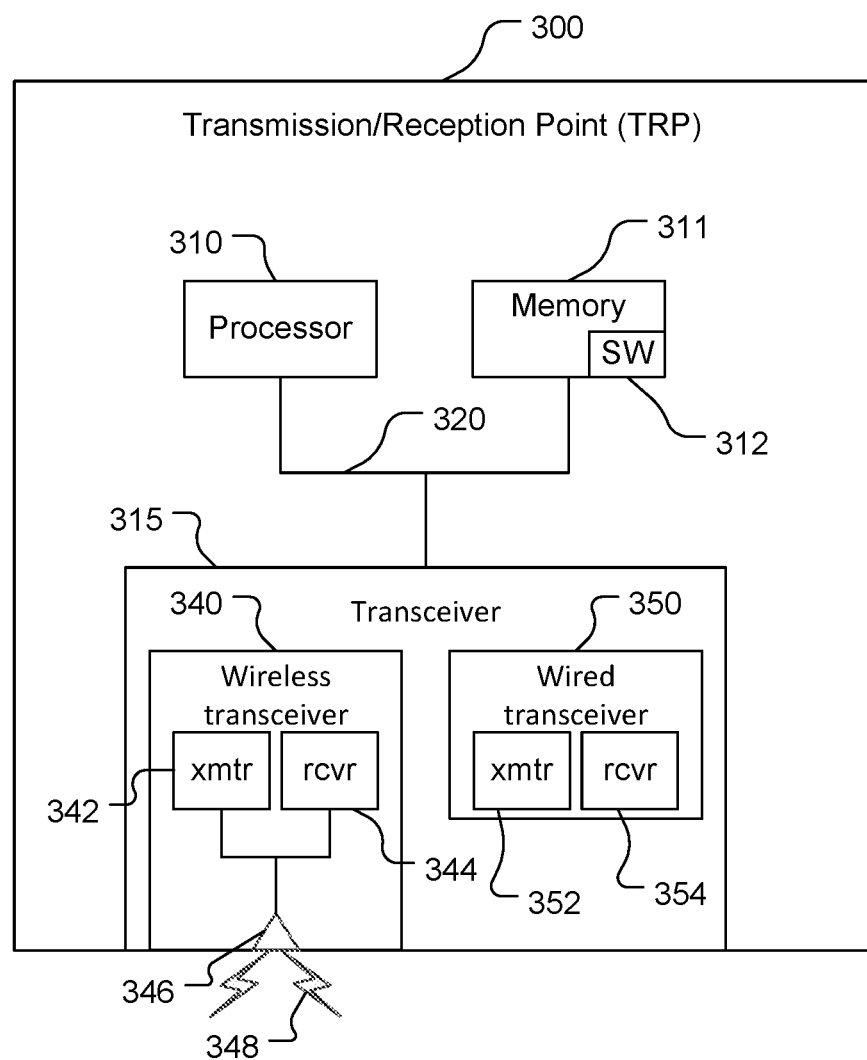
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
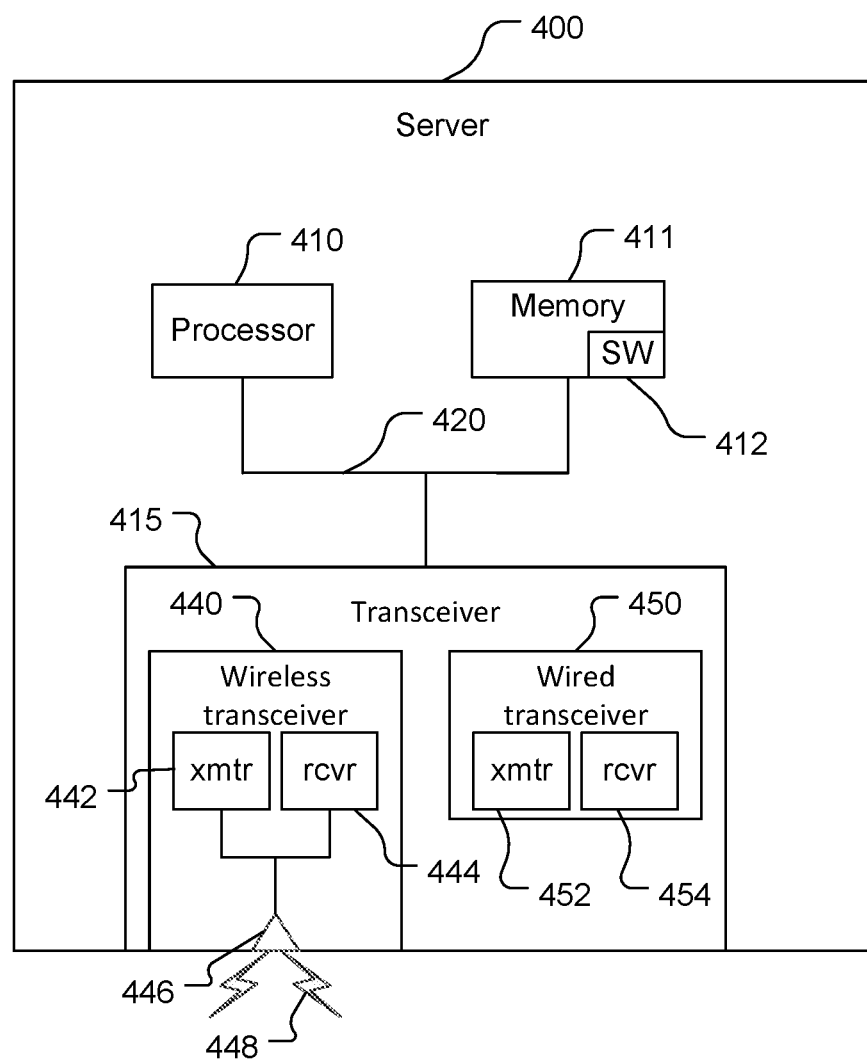
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

PRS Measuring and Measurement Reporting

Figure 5:
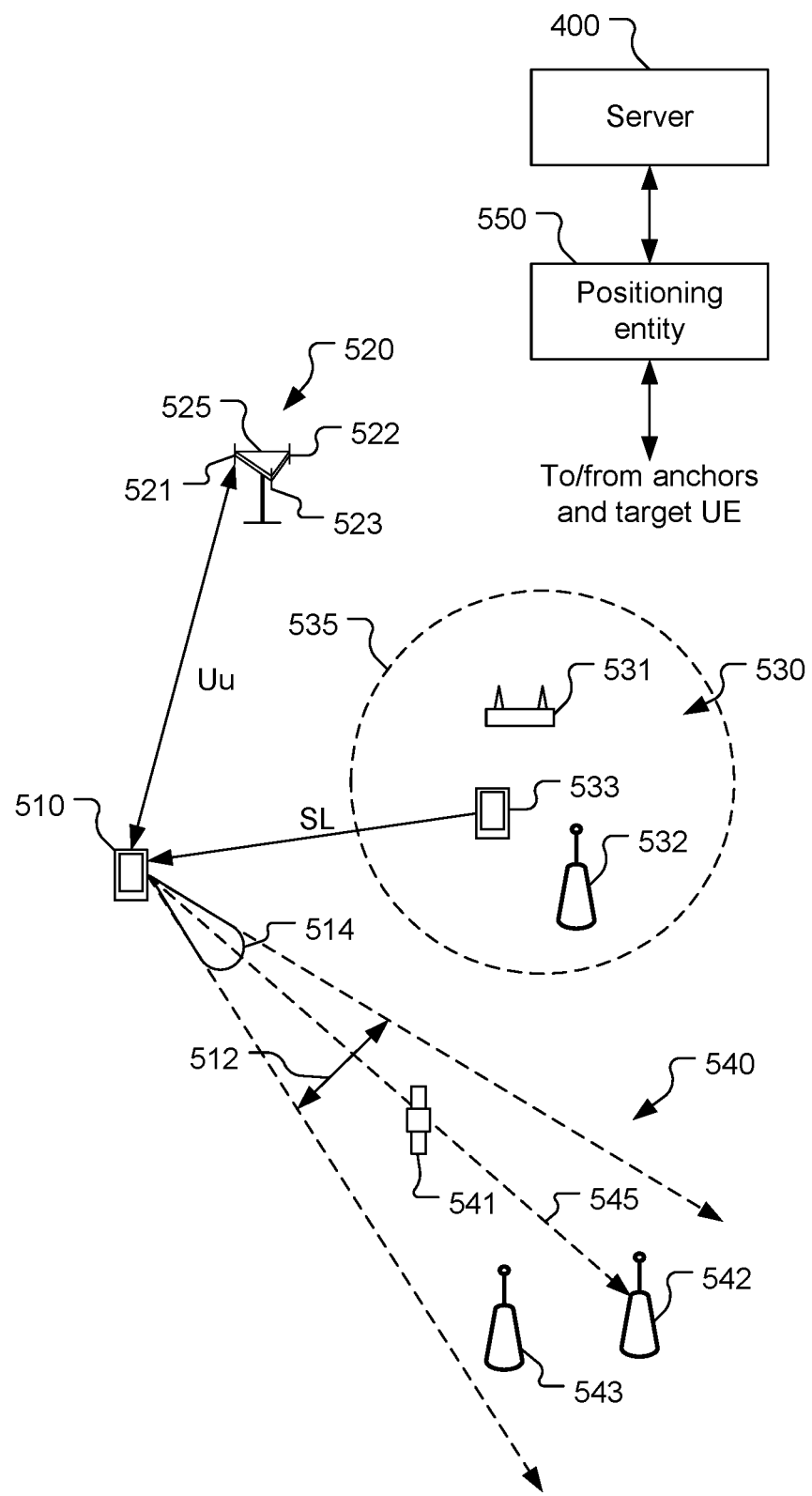
FIG. 5 is a simplified view of a target user equipment and grouped positioning anchors.
Figure 6:
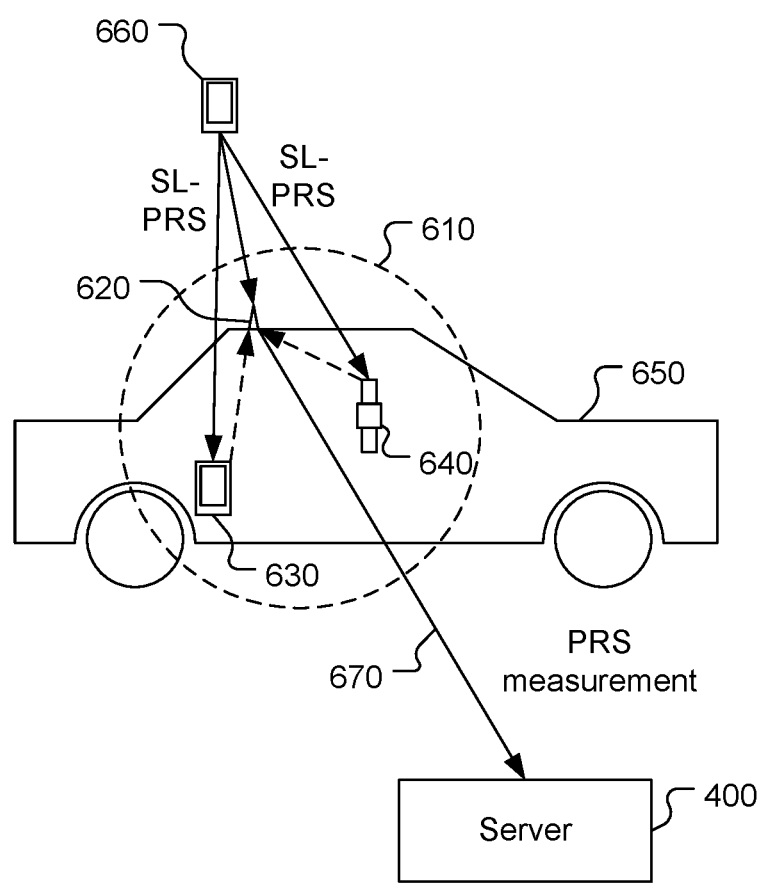
FIG. 6 is a block diagram of group of anchor devices acting as a virtual user equipment.

Referring to FIGS. 5 and 6, with further reference to FIGS. 1-4, a target UE 510 (a UE whose location is desired) may exchange PRS (UL PRS, DL PRS, SL PRS) with anchors (e.g., TRPs and/or other UEs) to determine position information (e.g., PRS measurements, pseudoranges, etc.) from which the location of the target UE 510 may be determined. Anchors are devices with which the UE 510 can exchange signals (e.g., PRS), and whose locations (e.g., estimated locations) are known, for use in determining the location of the target UE 510. A group of multiple anchors may be similarly geographically disposed relative to the target UE 510, e.g., such that measurements from different anchors in the group may add little to positioning accuracy of the target UE 510 (e.g., increase positioning accuracy less than a threshold amount) compared to having one of the measurements. There may be multiple such groups, with the anchors in each group being similarly geographically disposed. The anchors may be geographically similar in a variety of ways. For example, multiple anchors 521, 522, 523 of a base station 525 comprise a group 520 of anchors that are co-sited (i.e., co-located), in this case being part of a single device and in close proximity (e.g., within 2 meters of each other, within 5 m of each other, etc.). As another example, a group 530 of anchors 531, 532, 533 (here, a WiFi router, an access point, and a smartphone) are disposed within an area boundary (e.g., a threshold distance of each other), in this example, being within a circle 535. The anchors 531-533 of the group 530 are geographically similar for a range measurement to the target UE 510. As another, a group 540 of anchors 541, 542, 543 are disposed within a threshold angle of a line 545 from the target UE 510 and/or within an angular span 512 of a beam 514 of the target UE 510. As other examples, a geographically-similar group of anchors may have anchors that are at a similar height (e.g., the same height or within a threshold of a height (e.g., a threshold distance or percent)), and/or in the same plane or within a threshold of the same plane. The target UE 510 may report one PRS measurement for each geographically-similar group of anchors so that PRS measurements from geographically-diverse sources may be reported. For example, with a limited number of PRS measurements that the target UE 510 can report, the target UE 510 limits the number of measurements that the target UE 510 reports from any one group, allowing for measurements from other anchors (in a group or not) to be reported. Additional geographic diversity of sources from which PRS are measured and reported may improve positioning accuracy of the target UE 510 and reduce signaling overhead. Information regarding anchor groups and anchors (inside or outside the group(s)) may be provided to the target UE 510 from a positioning entity 550 that is in communication with (and possibly a part of) the server 400. The anchor group information may indicate one or more parameters of the group and an expiration time of the anchor group information and/or a mobility status of one or more of the group members (e.g., that the target UE 510 may use to determine to stop using the anchor group information). For groups of geographically-similar anchors with at least one mobile anchor, an indication of the transient nature of the group (e.g., a time limit and/or one or more mobility status indicators) may be used to affect the treatment of the anchors as a group.

The groups 520, 530, 540 shown in FIG. 5 are examples only and other groups of anchors are possible. Groups, such as the groups 520, 530, 540 may include a mix of one or more stationary anchors and one or more mobile anchors, e.g., UEs, or may include stationary anchors only, or may include mobile anchors only (i.e., devices configured for mobility even if one or more of the devices is stationary (e.g., temporarily stationary)). For example, referring also to FIG. 6, a group 610 of geographically-similar anchors where all members of the group are mobile UEs is possible. In this example, the group 610 includes anchors 620, 630, 640 that are all mobile UEs. As shown, the anchor 620 is a vehicle UE (being attached to or part of a vehicle 650), the anchor 630 is a smartphone, and the anchor 640 is a smartwatch. These are examples only, as a group of anchors may contain other types devices and/or other quantities of anchors.

Figure 7:
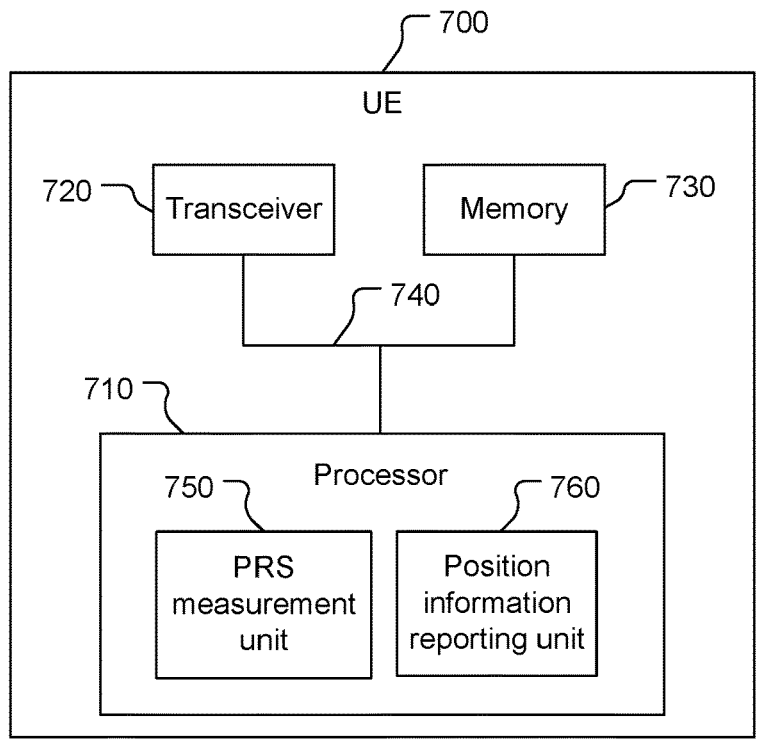
FIG. 7 is a block diagram of an example user equipment.

Referring to FIG. 7, a UE 700 includes a processor 710, a transceiver 720, and a memory 730 communicatively coupled to each other by a bus 740. The UE 700 may include the components shown in FIG. 7, and may include one or more other components such as any of those shown in FIG. 2 such that the UE 200 may be an example of the UE 700. For example, the processor 710 may include one or more of the components of the processor 210. The transceiver 720 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 720 may include the wired transmitter 252 and/or the wired receiver 254. The memory 730 may be configured similarly to the memory 211, e.g., including software with processor-readable instructions configured to cause the processor 710 to perform functions.

The description herein may refer only to the processor 710 performing a function, but this includes other implementations such as where the processor 710 executes software (stored in the memory 730) and/or firmware. The description herein may refer to the UE 700 performing a function as shorthand for one or more appropriate components (e.g., the processor 710 and the memory 730) of the UE 700 performing the function. The processor 710 (possibly in conjunction with the memory 730 and, as appropriate, the transceiver 720) may include a PRS measurement unit 750 and a position information reporting unit 760. The PRS measurement unit 750 and the position information reporting unit 760 are discussed further below, and the description may refer to the processor 710 generally, or the UE 700 generally, as performing any of the functions of the PRS measurement unit 750 and the position information reporting unit 760.

Figure 8:
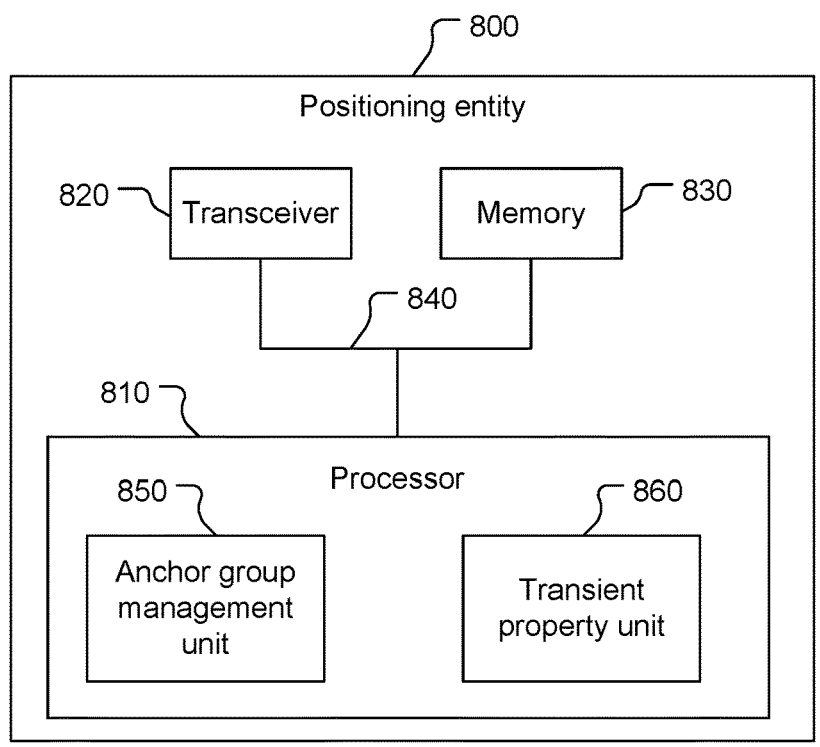
FIG. 8 is a block diagram of an example positioning entity.

Referring to FIG. 8, a positioning entity 800 includes a processor 810, a transceiver 820, and a memory 830 communicatively coupled to each other by a bus 840. The positioning entity 800 may include the components shown in FIG. 8, and may include one or more other components such as any of those shown in FIG. 2, or FIG. 3 and/or FIG. 4 such that the positioning entity 800 may be part of the server 400 (e.g., a location server such as an LMF), integrated in the TRP 300, or integrated in the UE 700. Thus, reference to the processor 810, the transceiver 820, or the memory 830 is equivalent to reference to the corresponding component(s) of the server 400, the TRP 300, or the UE 700. For example, the transceiver 820 may include one or more of the components of the transceiver 215 or the transceiver 315 and/or the transceiver 415, e.g., the antenna 246 and the wireless transmitter 242 and/or the wireless receiver 244, the antenna 346 and the wireless transmitter 342 and/or the wireless receiver 344, and/or the antenna 446 and the wireless transmitter 442 and/or the wireless receiver 444. Also or alternatively, the transceiver 820 may include the wired transmitter 252 and/or the wired receiver 254, or the wired transmitter 352 and/or the wired receiver 354, and/or the wired transmitter 452 and/or the wired receiver 454. The memory 830 may be configured similarly to the memory 211, or the memory 311 and/or the memory 411, e.g., including software with processor-readable instructions configured to cause the processor 810 to perform functions.

The description herein may refer only to the processor 810 performing a function, but this includes other implementations such as where the processor 810 executes software (stored in the memory 830) and/or firmware. The description herein may refer to the positioning entity 800 performing a function as shorthand for one or more appropriate components (e.g., the processor 810 and the memory 830) of the positioning entity 800 performing the function. The processor 810 (possibly in conjunction with the memory 830 and, as appropriate, the transceiver 820) may include an anchor group management unit 850 and a transient property unit 860. The anchor group management unit 850 and the transient property unit 860 are discussed further below, and the description may refer to the processor 810 generally, or the positioning entity 800 generally, as performing any of the functions of the anchor group management unit 850 and/or the transient property unit 860.

The positioning entity 800 may be a standalone device, or may be part of or integrated with a server (e.g., and LMF), a TRP, or a UE. For example, for Uu- and SL-based positioning (i.e., using signaling between a UE and a network entity, and signaling between UEs, respectively), the positioning entity may be a standalone device or part of the TRP 300 or part of the server 400 and may have knowledge of the location(s) of the anchor(s) (e.g., estimated location(s)). For SL-based joint positioning, the positioning entity may be part of a UE with knowledge of the location(s) of the anchor(s), one or more of which may be UEs, with the UE containing positioning entity possibly being an anchor. Having the positioning entity 800 be part of a UE may be particularly useful, for example, for V2X applications and/or out-of-coverage (e.g., out-of-cellular-coverage positioning) applications.

The positioning entity 800 (e.g., the anchor group management unit 850) may be configured to determine that devices (candidate anchors) are geographically similar (at least with respect to a target UE whose location is to be determined) and thus may be considered to be members of an anchor group. For example, the anchor group management unit 850 may obtain one or more present locations of one or more corresponding candidate anchors and/or one or more locations over time of one or more corresponding candidate anchors to determine that multiple candidate anchors are presently geographically similar (e.g., in close proximity to each other, disposed along or close to along a line relative to a target UE, at a similar height, in or close to in a plane intersecting a target UE, etc.) and can be treated as an anchor group presently and/or will be geographically similar in the future and can be treated as an anchor group at that time. For example, the anchor group management unit 850 may determine that anchor candidates are geographically similar based on one or more indications that anchors have an acceptably-low separation distance (e.g., below a threshold separation). The anchor group management unit 850 may determine that the separation distance is acceptably low by analyzing one or more factors such as one or more ranging measurements using SL-RTT, estimated RSSI and/or estimated RSRP, transmit power and path loss, time of flight (TOF), and/or one or more sensor (e.g., radar, lidar) measurements, successful connection of anchors using a short-range wireless protocol such as WiFi, Bluetooth®, Bluetooth® Low-Energy (BLE), etc.

The positioning entity 800 (e.g., the anchor group management unit 850) may be configured to provide one or more anchor group attributes to a target UE, e.g., the UE 700. Each anchor may be associated with one or more attributes and may belong to one or more anchor groups. Each anchor group attribute may provide an indication of a geographic similarity of anchors in an anchor group corresponding to the attribute, e.g., as indicated in a message including the anchor group attribute. For example, the anchor group management unit 850 may transmit a co-site attribute to the UE 700 indicating that the members of the anchor group are co-located (e.g., part of a single device). This may be similar to, or the same as, providing an area boundary (discussed below) if the location of the site is provided (e.g., by an LMF in UE-based positioning). As another example, an anchor group attribute may be a line attribute indicating a line that passes through each of the group members or that passes within a threshold distance of each of the group members. The line may be a line that also passes through the target UE (based on an estimation of the location of the target UE (e.g., based on E-CID)), e.g., such that signals exchanged between the target UE and the group members have similar AoD/AoA (e.g., within a resolution of the target UE such as being within a width of a beam of the target UE), providing little if any angle diversity for the target UE. As another example, an anchor group attribute may be an area boundary attribute indicating an area containing all of the group members, e.g., a regular or irregular shape. Examples of regular shapes include, but are not limited to, circles, rectangles (including squares), and triangles. An area boundary may be a threshold distance (generally, or with respect to a reference location), e.g., 2 m, 5 m, etc. An example area boundary attribute may indicate a radius and a center of a circle, or the radius of the circle alone. As another example, an anchor group attribute may be a height attribute indicating a height (e.g., relative to sea level) at which the group members are disposed. As another example, an anchor group attribute may be a height boundary attribute indicating a threshold height value within which the group members are disposed (e.g., a threshold value with respect to a reference height, or a threshold range value within which the group members are disposed relative to each other without an indication of a reference height). As another example, an anchor group attribute may be a plane attribute indicative of a two-dimensional plane containing the group members (or indicative of a plane and a threshold distance, with the group members each being disposed within the threshold distance from the plane). A threshold and/or uncertainty may be provided, as appropriate, for an attribute (e.g., for an attribute that is not already a threshold). The attribute(s) may be provided along with a group ID indicating the group members, and may be provided without underlying data of the attribute(s). For example, the height threshold may be provided without providing the heights of the anchors. As another example, an area boundary may be provided without providing the individual locations of the anchors.

One or more anchor attributes may be provided to the UE 700 in one or more of a variety of manners. For example, the positioning entity 800 (e.g., the anchor group management unit 850) may transmit one or more attributes periodically, semi-persistently (i.e., periodically triggered aperiodically), or aperiodically (e.g., upon request). The anchor attribute(s) may be provided by the positioning entity 800 to the UE 700 after the UE 700 makes a request, after the network (including the TRP 300) is configured, or when the network configures a maximum size of the ToAs to be reported. Also or alternatively, the anchor attribute(s) may be transmitted by the positioning entity 800 as part of PRS configuration information (e.g., assistance data) if the positioning entity 800 is part of a network node (e.g., the server 400 or the TRP 300).

Signaling of the anchor attributes may be in the form of collections of PRS IDs in which a common attribute (e.g., co-site, line, area boundary, height, height boundary, plane) is identified with a particular PRS ID. For example, the PRS ID may include a scrambling ID, and the attribute information may be embedded in the scrambling IDs of the PRS. The UE 700 may use the scrambling ID of each PRS to identify the anchor group to which the corresponding anchor belongs. For example, for a scrambling ID of 16 bits, the last two bits (e.g., bits 1 and 0) may be used for the co-site attribute. In this example, the scrambling IDs of two PRS having the same last two bits indicates that the two corresponding anchors are co-sited. Conversely, the last two bits being different indicates that the two anchors are not co-sited, i.e., located at different sites. In this example, the last two bits are mapped to a co-site attribute type. As another example, bits 4-2 may be used for the height attributes, with PRS IDs having the same values in bits 4-2 corresponding to anchors at the same height.

Generally, if a specified set of bits of the scrambling ID is the same for two or more anchors, then the same two or more anchors belong to, i.e., are member anchors of, an anchor group with a configured attribute. For example, bits of each scrambling ID may be divided into one or more attribute bit ranges. Each attribute bit range may comprise one or more bits, and may be mapped to an attribute type (e.g., co-site attribute type, line attribute type, area boundary attribute type, height attribute type, height boundary attribute type, plane attribute type, and so on). For each anchor of the anchor group, each attribute of the anchor may be encoded in the attribute bit range of the scrambling ID mapped to the attribute type of the attribute.

As another example, the attribute information may be embedded into an RRC (Radio Resource Control) configuration. The PRS may be configured with resource IDs. Different resource IDs may be associated with different attributes of the anchors transmitting the PRS. For example, the UE 700 may determine that every three resource IDs are co-sited. That is, anchors transmitting PRS with resource IDs 0-2 are member anchors of an anchor group co-sited in one location, anchors with resource IDs 3-5 are member anchors of an anchor group co-sited in another location, and so on. The actual locations (e.g., x, y, z coordinates) may or may not be provided to the UE 700.

As another example, the UE 700 may determine that anchors with resource IDs 10-15 are member anchors of an anchor group at one height, anchors with resource IDs 16-20 are member anchors of an anchor group at another height, and so on. The actual heights of the anchors may or may not be known to the UE 700. The positioning entity 800 may inform the UE 700 that heights of member anchors among different anchor height groups differ from each other by at least a threshold amount.

Generally, multiple PRS may include multiple resource IDs. The resource IDs may be grouped into one or more resource ID groups, and each resource ID group may correspond to an anchor group. In other words, each resource ID group may correspond to an attribute set of one or more attributes as described above.

The UE 700 may be configured with a default resource ID grouping to associate different groups of resource IDs with different attribute sets. Also or alternatively, the resource ID group information may be received from a network entity, such as the server 400. For example, when the UE 700 receives the resource ID group information from the network, the UE 700 may overwrite any previous resource ID group information.

With one or more anchors in a group being a mobile anchor, e.g., a UE, the transient property unit 860 of the positioning entity 800 may determine one or more transient properties for an anchor group that the anchor group management unit 850 can provide to the UE 700. For example, a transient property of an anchor group may be an expiration time for the group such that after passage of the expiration time one or more the group attributes will be invalid (e.g., should not be used/relied on by the UE 700 although the attribute may still be correct), although the attribute(s) may be renewed (e.g., by provision of updated assistance data with the same attribute value(s)). The expiration time may be a time of day such that once that time of day passes, the corresponding group attribute(s) will be invalid. As another example, the expiration time may be an amount of time so that after passage of the amount of time (e.g., after receipt of an indication of the expiration time) the group attribute(s) will be invalid (e.g., X seconds after receipt of the indication of the expiration time). The amount of time may be indicated in one or more of a variety of manners, e.g., a quantity of seconds, frames, subframes, slots, symbols, PRS instances, or PRS repetitions.

The transient property unit 860 may be configured to determine, as a transient property, an expiration time for an anchor group based one factor and/or to determine the expiration time based on multiple factors. For example, the transient property unit 860 may base an expiration time on a present trajectory, a predicted trajectory, a present speed, a predicted speed, a present direction, a predicted direction, a present orientation, a present location, a present mobility status, and/or a predicted mobility status, and/or one or more other factors, of one or more of the anchors of an anchor group (e.g., based on present location(s) and/or location(s) over time). This information may be provided by one or more of the group members, e.g., by request from the positioning entity, and/or may be estimated by the positioning entity 800 (e.g., based on one or more measurements, e.g., over time). Some of this information may be known in advance, e.g., due to the nature of the anchor, e.g., a base station having a mobility status of "static."

The transient property unit 860 may determine from one or more values of one or more of the factors, for one or more of the anchors of a group, a value of the expiration time. The expiration time may correspond to when at least one of the anchor group attributes of the anchor group will no longer be correct and/or when, absent an update to the contrary, the UE 700 should stop considering the anchor members as an anchor group and/or stop using the anchor attribute value(s). For example, the expiration time may correspond to when the anchor group members are expected to no longer be geographically similar enough to be considered as a group, e.g., when one or more attribute values will exceed one or more respective thresholds for being considered as geographically similar (e.g., co-sited) such as when a maximum radius to be considered geographically similar will be exceeded, when a maximum angular range to be considered geographically similar will be exceeded, etc.

The expiration time may have the anchor group be valid for varying lengths, e.g., from a fraction of a second to multiple seconds or longer. For example, if all the members of an anchor group are all mobile together, e.g., in a single vehicle as shown in FIG. 6, then an expiration time may cause the anchor group to be valid for a long time, even minutes or tens of minutes or longer (e.g., based on a location of the vehicle 650, present velocity, and next expected time for separation of the anchors 620, 630, 640 (e.g., a highway exit)).

The transient property, e.g., the expiration time, may be updated, e.g., to extend the expiration time if a determination is made that the anchor group will exist longer than earlier determined/predicted. For example, continuing the prior example, if a highway exit is passed, then the expiration time may be updated for the next highway exit. As another example, the expiration time may be extended in response to the mobile anchor(s) of a group becoming static. As another example, the expiration time may be changed (e.g., extended or shortened) in response to the motion (e.g., speed and/or direction) of the mobile anchor(s) changing (e.g., speed decreasing or speed increasing). As another example, the expiration time may be shortened in response to the static anchor(s) of a group becoming mobile.

Also or alternatively, the transient property unit 860 may be configured to determine, as a transient property, a mobility of one or more of the group members. For example, the transient property unit 860 may determine which member(s), if any, of the anchor group are presently in motion and/or which member(s), if any, of the anchor group are presently stationary. The anchor group management unit 850 may provide one or more indications of the mobility to the UE 700, e.g., to help the UE 700 determine which PRS measurement(s) to report and/or which PRS measurement(s) to use for reference in determining and reporting one or more differential measurements.

The transient property may be provided by the positioning entity 800 to the UE 700 in a variety of manners. For example, the transient property may be provided as part of group information and/or as part of information for a member of the anchor group (and may be provided for each of multiple members of the group). The transient property may be provided periodically, semi-persistently, or aperiodically, with semi-persistent or aperiodic provision being triggered, e.g., by a request from the UE 700 or by a change in anchor mobility status (e.g., from static to mobile or mobile to static, a change in speed and/or direction, etc.). The positioning entity 800 may provide the transient property to the UE 700 using appropriate communication, e.g., LPP, RRC, MAC-CE (Media Access Control-Control Element), DCI (Downlink Control Information), etc. The (indication of the) transient property may be included with assistance data (e.g., IDs) of each anchor group, e.g., along with a PRS configuration and/or an RRC configuration, and/or along with information for each anchor in the anchor group (e.g., PRS ID).

Members of an anchor group may work together to measure PRS from the UE 700 and/or send PRS to the UE 700. For example, the group 610 of UE anchors shown in FIG. 6 may operate in concert, e.g., effectively as a single apparatus. The anchors 620, 630, 640 may communicate with each other to share information, e.g., one or more PRS measurements of PRS transmitted by a UE 660, which may be an example of the UE 700. The anchors 620, 630, 640 may be coordinated (possibly under the direction of the positioning entity 800) to have a subset of the anchors 620, 630, 640 measure PRS from the UE 660 and/or to have a subset of the anchors 620, 630, 640 transmit PRS to the UE 660. One of the anchors 620, 630, 640 may transmit a single PRS measurement for the group 610 to the server 400. For example, as indicated, the anchors 630, 640 may share PRS measurement information with the anchor 620 and the anchor 620 may transmit a PRS measurement 670 for the group 610 to the server 400. Also or alternatively, the UE 700 may send PRS for a single member of the anchor group for measurement and reporting to the server 400.

The position information reporting unit 760 is configured to transmit a measurement report of position information (e.g., PRS measurement(s)) to the server 400 (e.g., via the TRP 300). For example, the PRS measurement unit 750 may measure one or more PRS corresponding to one or more anchors in a group. The position information reporting unit 760 may be configured to report the sole PRS measurement that is made for a group. The position information reporting unit 760 may be configured to select one or more PRS measurements to report in response to the PRS measurement unit 750 making multiple PRS measurements for an anchor group. The PRS measurement unit 750 may be configured to select which PRS to measure, e.g., based on mobility status of the anchors in an anchor group, and/or the position information reporting unit 760 may be configured select which PRS measurements to report, e.g., based on mobility status of the anchors in an anchor group. For example, the UE 700 may be configured to implement a priority protocol to give higher priority to measuring PRS from stationary anchor(s) and/or to reporting PRS measurement(s) of PRS from stationary anchor(s). Also or alternatively, when measuring PRS from multiple non-stationary anchors, the UE 700 may be configured to give higher priority to measuring PRS from the anchor(s) that is(are) less stationary than one or more other anchors and/or to reporting PRS measurement(s) of PRS from the anchor(s) that is(are) less stationary than one or more other anchors. The UE 700 may thus be configured to measure a PRS from a stationary anchor UE with higher priority than a PRS from a non-stationary UE, to measure a PRS from a relatively more-stationary anchor UE with higher priority than a PRS from a relatively less-stationary UE, to report a measurement of a PRS from a stationary anchor UE with higher priority than a measurement of a PRS from a non-stationary UE, and/or to report a measurement of a PRS from a relatively more-stationary anchor UE with higher priority than a measurement of a PRS from a relatively less-stationary UE.

The position information reporting unit 760 may report one or more PRS measurements for each anchor group. For example, the position information reporting unit 760 may report a single PRS measurement per anchor group by default, or as a limit. As another example, the position information reporting unit 760 may report more than one PRS measurement for one or more anchor groups in response to a limit of a number of PRS measurements that the UE 700 can report exceeding a quantity of anchor groups and anchors, not belonging to a group, from which the PRS measurement unit 750 measured PRS. The position information reporting unit 760 may select which PRS measurements to report for a single anchor group based on a geographic diversity of the anchors in a group. For example, the position information reporting unit 760 may select the anchors that are most geographically dissimilar within the anchor group (if appropriate information is available from which to determine this). As another example, the position information reporting unit 760 may select which anchor group from which to report multiple PRS measurements based on which group has the best geographic diversity, e.g., the largest co-site attribute, the largest area boundary, the largest co-site uncertainty, etc.).

The position information reporting unit 760 may be configured to transmit the measurement report with one or more baseline measurements and one or more differential measurements, with each differential measurement being a difference relative to a respective baseline measurement. Reporting one or more PRS measurements as one or more differential measurements may reduce signaling overhead compared to reporting all the PRS measurements independently (i.e., without regard to a reference). The UE 700 may be configured to select one or more PRS measurements to use as one or more baseline measurements based on the mobility status of the corresponding anchor(s). For example, the UE 700 may be configured to give higher priority to using a PRS measurement of a PRS from a stationary anchor as a baseline measurement than a PRS measurement of a PRS from a non-stationary anchor. Also or alternatively, for reporting PRS measurements of PRS from multiple non-stationary anchors, the UE 700 may be configured to give higher priority to using, as a baseline measurement, a PRS measurement of a PRS from an anchor that is less stationary than one or more other anchors.

The measurement and/or reporting priority(ies) may be statically configured (e.g., during manufacture by design) or dynamically configured (e.g., by an instruction wirelessly received by the transceiver 720), if configured at all. The reporting priority may be the same as the measurement priority or different from the measurement priority. For example, the priority may be dynamically configured in a PRS configuration and/or through RRC signaling, and/or may be statically configured according to an industry standard (i.e., a specification). The UE 700 may be configured to allow a static configuration to be overruled by a dynamic configuration.

Figure 9:
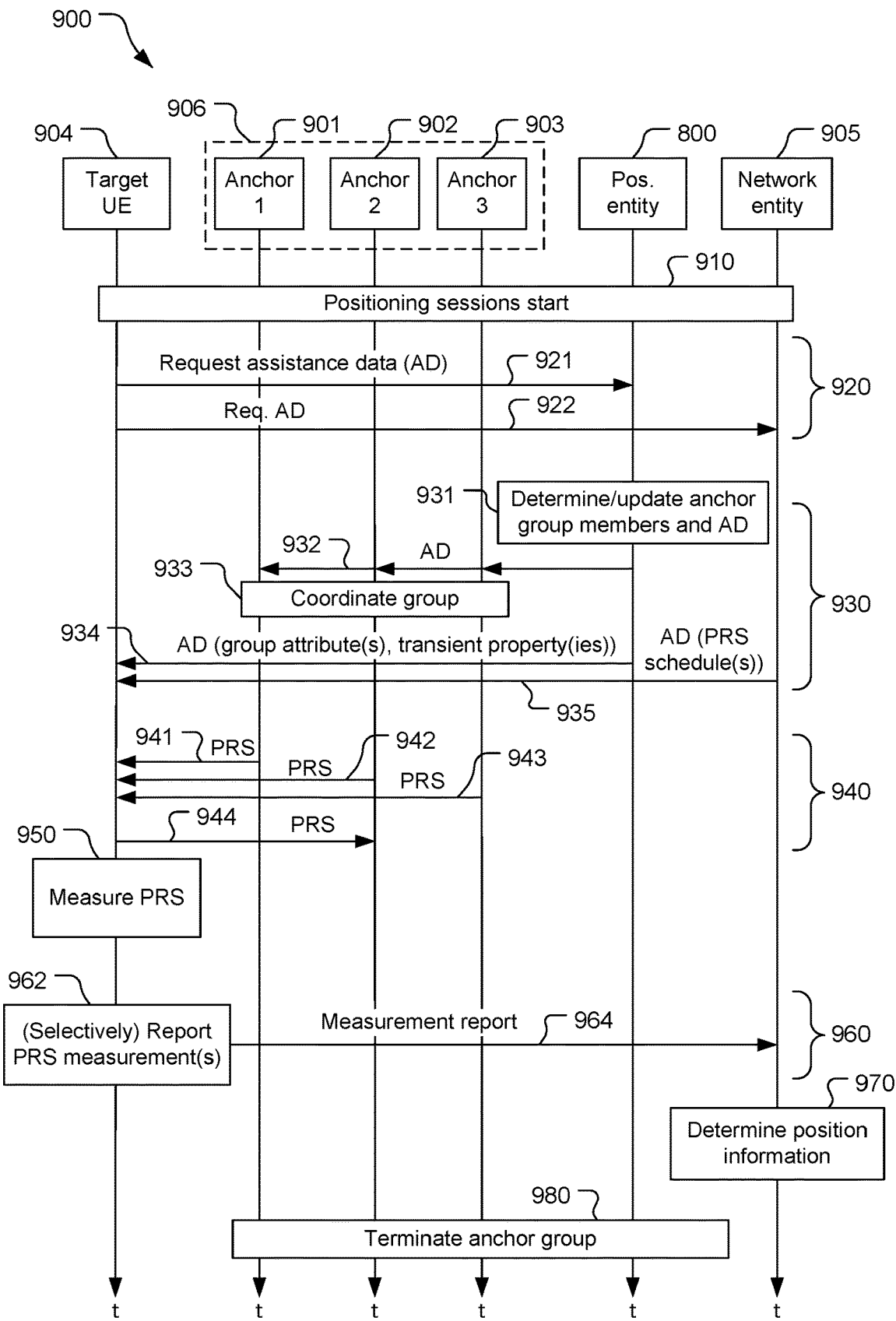
FIG. 9 is a signaling and process flow diagram of a method of determining position information.

Referring to FIG. 9, with further reference to FIGS. 1-8, a signaling and process flow 900 for measuring PRS involving an anchor group with at least one mobile anchor, and determining position information therefrom, includes the stages shown. The flow 900 is an example only, as stages may be added, rearranged, and/or removed.

At stage 910, position sessions between a target UE 904 and a network entity 905, and between the network entity 905 and anchors 901, 902, 903, start. The anchors 901-903 form an anchor group 906 with the anchors 901-903 being geographically similar (at least with respect to the target UE 904). The target UE 904 and the anchors 901-903 perform respective handshakes by exchanging appropriate messages to establish respective positioning sessions for exchanging signaling for use in determining a position (location) of the target UE 904. The handshaking may include determining a positioning technique and appropriate position information (measurement(s) and/or location estimate(s)) to be determined. Each of the target UE 700 and the anchors 901-903 may be an example of the UE 700. The network entity 905 comprises the server 400 and the TRP 300.

At stage 920, the target UE 904 requests assistance data (AD) from the positioning entity 800 and the network entity 905. The target UE 904 sends an AD request 921 to the positioning entity 800 and an AD request 922 to the network entity 905 (e.g., the server 400 via the TRP 300). Either or both of the AD requests 921, 922 may be for periodic, semi-persistent, or aperiodic provision of respective AD.

At stage 930, the positioning entity 800 determines and provides AD 932 to the anchors 901-903 and provides AD 934 to the target UE 904, and the network entity 905 determines and provides AD 935 to the target UE 904. At sub-stage 931, the positioning entity 800 determines/updates anchor group members, e.g., based on candidate anchors being geographically similar (e.g., having acceptably-low separation(s)), e.g., as indicated by anchor locations and/or other indicia of geographic similarity of candidate anchors. For example, for stationary anchors such as base station anchors, the processor 810 may retrieve one or more anchor locations from the memory 830 or may receive one or more location indications from the network entity 905 (e.g., the server 400). As another example, for an anchor that is configured to be mobile (e.g., a UE), the processor 810 may obtain one or more location estimates from the network entity 905, may obtain one or more location estimates from one or more of the anchors 901-903, may obtain the location(s) by determining the location(s) from position information (e.g., one or more PRS measurements and/or one or more pseudoranges to the anchor(s), and known locations corresponding to the measurement(s) and/or pseudorange(s)). The anchor locations may be updated, e.g., with locations determined by the anchors 901-903 (and provided to the network entity 905) and/or the network entity 905 determined over time (e.g., so that the anchors 901-903 remain anchors, with known locations). The updated locations are provided to the positioning entity 800 for determination of anchor group members (e.g., status quo, addition of member(s), or reduction of members) or to determine to terminate the anchor group 906 (e.g., as discussed below with respect to stage 980). The processor 810 may also or alternatively obtain other information such as one or more ranging measurements, estimated RSSI and/or estimated RSRP, transmit power and path loss, time of flight between anchors, and/or one or more sensor (e.g., radar, lidar) measurements, one or more indications of successful connection of anchors using a short-range wireless protocol. Based on the locations of the anchors 901-903 and/or one or more other indications of geographic similarity of anchors, the anchor group management unit 850 determines that the anchors 901-903 can be considered to be an anchor group, and in response determines assistance data for the anchor group.

The positioning entity 800 transmits the AD 932 to the anchors 901-903. The AD 932 is shown as being relayed from the anchor 903 to the anchor 902 to the anchor 901, but this is not required, and the AD 932 may be provided by the positioning entity 800 to the anchors 901-903 in any appropriate manner (e.g., directly to each of the anchors 901-903). The AD 932 includes a group ID identifying the anchor group 906 (i.e., the anchor group members) so that the anchors 901-903 may act as a single apparatus, coordinating PRS exchange with the target UE 904. At sub-stage 933, the anchors 901-903 coordinate (e.g., exchange communications to agree) such that one of the anchors 901-903 will measure PRS from the target UE 904 on behalf of the anchor group 906 (e.g., without other anchors of the anchor group 906 doing so) and/or one of the anchors 901-903 will send PRS to the target UE 904 on behalf of the anchor group 906 (e.g., without other anchors of the anchor group 906 doing so). The AD 932 may include one or more transient properties of the anchor group 906, e.g., an expiration time of the anchor group 906 (e.g., a time of day or an amount of time from the present time (e.g., a timer value)).

The positioning entity 800 transmits the AD 934 to the target UE 904. The AD 934 provided to the target UE 904 may include a group ID for the anchor group 906. The AD 934 may include one or more anchor group attributes for the anchor group 906, and/or may include IDs of group members (i.e., the anchors 901-903) of the anchor group 906. The AD 934 may include one or more transient properties for each anchor group containing a mobile anchor (configured to be mobile whether the anchor is presently mobile or not). The transient property(ies) may include an expiration time and/or an indication of motion of the anchor group 906 and/or one or more members of the anchor group 906. The positioning entity 800 may transmit the AD 934 and/or the AD 932 periodically, semi-persistently (e.g., triggered by the AD request 921), or aperiodically (e.g., triggered by the AD request 921), and may update the AD 932 and/or the AD 934 (e.g., one or more transient properties of the anchor group 906, e.g., based on updated location of one or more of the anchors 901-903).

The network entity 905 transmits the AD 935 to the target UE 904, with the AD 935 including one or more PRS schedules, e.g., a sidelink PRS schedule for the target UE 904, PRS schedules of the anchor group members (e.g., SL PRS for UEs and DL PRS for TRPs), and PRS schedules for other relevant anchors whether those anchors are in an anchor group or not. The PRS schedules may provide schedules of DL-PRS, SL-PRS, and/or UL-PRS. The PRS schedules indicate the timing and frequency of PRS resources to assist the target UE 904 and the anchors 901-903 to measure the scheduled PRS resources. The PRS schedules may be negotiated by the server 400 and one or more TRPs 300 and provided to the anchors 901-903 and the target UE 904 by respective serving cells. The AD 932, the AD 934, and/or the AD 935 may indicate a protocol for the target UE 904 to use to determine which PRS to measure and/or to determine which PRS measurement(s) to report.

At stage 940, the anchors 901-903 and the target UE 904 transmit scheduled PRS. In the example shown in FIG. 9, the anchors 901-903 transmit respective PRS 941, 942, 943 to the target UE 904 and the target UE 904 transmits PRS 944 to the anchor 902. The anchors 901-903 may coordinate at sub-stage 933 (or be directed by an entity such as the positioning entity 800) to send PRS from a subset of the members of the group 906, e.g., from a single member of the group 906. In this example, the target UE 904 sends SL PRS to the anchor 902 and not the anchors 901, 903, e.g., selecting the anchor 902 based on the group attribute(s) and/or motion of one or more of the group members (e.g., based on the anchor 902 being stationary), etc. The anchors 901-903 may coordinate at sub-stage 933 (or be directed by an entity such as the positioning entity 800) to have a single one of the anchors 901-903 measure PRS from the target UE 904 (even if the target UE 904 transmits PRS for more than one of the anchors 901-903).

At stage 950, the target UE 904 measures some or all of the PRS 941-943. For example, the PRS measurement unit 750 of the target UE 904 may measure one or more PRS resources of the PRS 941-943, e.g., selecting the PRS resources to measure based on motion of one or more of the anchors 901-903 and/or one or more of the anchor group attribute(s) provided in the AD 934 (e.g., an uncertainty), etc.

At stage 960, the target UE 904 transmits position information to the network entity 905. At sub-stage 962, the position information reporting unit 760 determines what position information (e.g., which PRS measurement(s)) to report. The position information reporting unit 760 may select which of available PRS measurements to report, e.g., based on motion of the anchors corresponding to the measurements. The position information reporting unit 760 may select which measurement(s) to use as a baseline measurement and which measurement(s) to report as a differential measurement, e.g., based on motion of the corresponding anchors. The position information reporting unit 760 transmits a measurement report 964 to the network entity 905 with the position information. For example, the measurement report 964 may be transmitted directly from the target UE 904 to the server 400 or via the TRP 300.

At stage 970, the network entity 905 (e.g., the server 400) determines position information. For example, the processor 410 uses the measurement report 964, and possibly other information (e.g., measurements from one or more TRPs 300 of one or more signals from the target UE 904), to determine position information for the target UE 904, e.g., to determine one or more signal measurements, one or more ranges (e.g., pseudoranges), and/or one or more location estimates for the target UE 904. The network entity 905 may provide the location estimate(s) to one or more appropriate recipients, e.g., the target UE 904.

At stage 980, the positioning entity 800 terminates, and/or the anchors 901-903 terminate, the anchor group 906. For example, the anchor group management unit 850 determines that one or more criteria for the anchors 901-903 being anchor group 906 no longer exists and that the anchor group 906 should be terminated (e.g., even if two of the anchors 901-903 still satisfy the criterion (criteria) to be in a group, and may thus be members of another group). The anchor group management unit 850 may, for example, determine that one or more of the anchors 901-903 moves such that the anchors 901-903 are no longer geographically similar. As another example, the anchor group management unit 850 may determine that the anchor group 906 is unnecessary, e.g., due to the target UE 904 being able to determine or otherwise obtain a reliable, accurate location of the target UE 904 without use of the anchor group 906. For example, the target UE 904 may enter an area of good GNSS measurement accuracy and/or an area in which the target UE 904 may determine accurate location using PRS from one or more base stations. In response to determining to terminate the anchor group 906, the positioning entity 800 transmits a group termination indication to the anchors 901-903 and the anchors 901-903 respond by terminating the anchor group 906, e.g., ceasing to act as a single apparatus, e.g., with each of the anchors 901-903 transmitting PRS to the target UE 904 and/or measuring PRS from the target UE 904. Each of the anchors 901-903 may determine to terminate the anchor group 906, e.g., by determining that a validity condition of the anchor group 906 changes from being valid to being invalid. For example, the anchors 901-903 may determine that an expiration time (e.g., time of day or time amount) has passed (e.g., the time of day is reached, or the time amount has elapsed since receipt of the time amount from the positioning entity 800). The anchors 901-903 may communicate with each other regarding the termination of the anchor group 901-903 (e.g., with one or more of the anchors 901-903 determining to terminate the anchor group 906 and the anchors 901-903 communicating such that each of the anchors 901-903 determines to terminate the anchor group 906 and/or receives an indication to terminate the anchor group 906).

Figure 10:
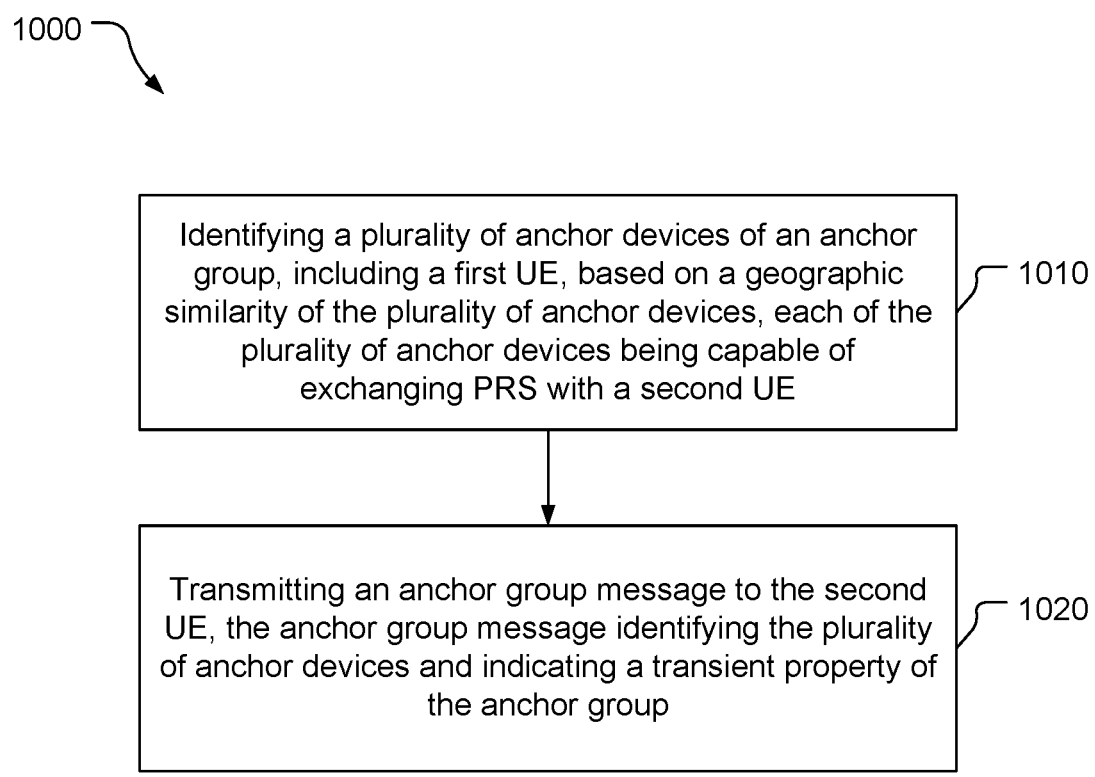
FIG. 10 is a block flow diagram of a positioning method.

Referring to FIG. 10, with further reference to FIGS. 1-9, a positioning method 1000 includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes identifying a plurality of anchor devices of an anchor group, including a first UE (user equipment), based on a geographic similarity of the plurality of anchor devices, each of the plurality of anchor devices being capable of exchanging PRS (positioning reference signal(s)) with a second UE. For example, the anchor group management unit 850 of the positioning entity 800 determines, at sub-stage 931 shown in FIG. 9 and discussed above, anchor group members, e.g., of the anchor group 906. The processor 810, possibly in combination with the memory 830, in combination with the transceiver 820 (e.g., an antenna and a wireless receiver, and/or a wired receiver, depending on a configuration of the positioning entity 800 (e.g., whether the positioning entity 800 is a standalone device or part of another device, and if so, what other device) may comprise means for identifying the plurality of anchor devices.

At stage 1020, the method 1000 includes transmitting an anchor group message via the transceiver to the second UE, the anchor group message identifying the plurality of anchor devices and indicating a transient property of the anchor group. For example, the positioning entity determines and transmits the AD 934 to the target UE 904. The processor 810, possibly in combination with the memory 830, in combination with the transceiver 820 (e.g., a wireless transmitter and an antenna) may comprise means for transmitting the anchor group message.

Implementations of the method 1000 may include one or more of the following features. In an example implementation, the transient property of the anchor group is an expiration time of the anchor group. The expiration time may be a time of day or an amount of time (e.g., a timer setting). In another example implementation, the method 1000 includes determining the expiration time of the anchor group based on motion of the first UE relative to another member of the anchor group. For example, the transient property unit 860 determines the expiration time based on speed (and possibly direction) of the anchor 901 relative to the anchor 902 (and/or the anchor 903), which may be a UE, a gNB, etc. The processor 810, possibly in combination with the memory 830, may comprise means for determining the expiration time. In another example implementation, determining the expiration time comprises determining the expiration time of the anchor group based on a predicted time that the first UE and the other member of the anchor group will fail to meet at least one criterion for being considered to be geographically similar. For example, the transient property unit 860 may determine the expiration time such that the anchor group 906 becomes invalid at a time based on a time that at least one attribute of the anchor group is expected to no longer apply to at least two of the members. At that time, the members will have at least a threshold level of geographic diversity (e.g., a distance separation, an angular separation relative to the target UE 904, etc.). Whether anchors are considered to be geographically similar may depend on a positioning technique to be used for processing measurements. For example, anchors separated by a large distance may be geographically dissimilar for RTT positioning but not for AoA positioning if the anchors are close in angle relative to the target UE 904.

Also or alternatively, implementations of the method 1000 may include one or more of the following features. In an example implementation, the transient property of the anchor group is a mobility status of at least the first UE. For example, the transient property may be a speed and/or direction of one or more of the anchors 901-903. The mobility status may be whether a particular anchor is stationary or presently in motion. The mobility status may indicate which one or more anchors of an anchor group (e.g., which of the anchors 901-903 of the anchor group 906) are presently stationary. The target UE 904 may use such information to determine, for example, which PRS to measure, which PRS measurement(s) to report, which PRS measurement to use as a baseline measurement and which PRS measurement(s) to report as differential measurements relative to the baseline measurement. More than one measurement may be used as a baseline measurement for an anchor group. A differential measurement may be indicated relative to a baseline measurement of a PRS transmitted by an anchor that is not in an anchor group, or not in the anchor group to which the differential measurement pertains.

Also or alternatively, implementations of the method 1000 may include one or more of the following features. In an example implementation, the method 1000 includes: receiving updated locations of the plurality of anchor devices of the anchor group; and at least one of: determining whether to modify membership of the anchor group based on the updated locations; or determining an updated transient property of the anchor group based on the updated locations and transmitting the updated transient property to the second UE; or terminating the anchor group based on the updated locations. For example, the anchor group management unit 850 receives updated locations for the anchors 901-903 and determines whether one or more of the anchors 901-903 (and/or one or more other anchors) should be removed from the anchor group, e.g., anchor group 906 (e.g., because an anchor is no longer geographically similar to the other anchor(s) of the anchor group). As another example, the anchor group management unit 850 may determine an updated transient property (e.g., an updated expiration time) for the anchor group based on the updated locations, e.g., extending or shortening a validity time of the anchor group accordingly. The validity time may be extended, for example, if the mobility has changed such that the anchors 901-903 are now expected to be geographically similar until a later time than previously expected. Conversely, the validity time may be shortened, for example, if the mobility has changed such that the anchors 901-903 are now expected to cease being geographically at an earlier time than previously expected. As another example, the anchor group management unit 850 may determine to terminate the anchor group 906, e.g., if the updated locations indicate that the anchors 901-903 are no longer geographically similar. The anchor group management unit 850 may transmit one or more messages to the target UE 904 and the anchors 901-903 as appropriate, e.g., to cause the anchors 901-903 to stop operating as a group (e.g., as a single apparatus). The processor 810, possibly in combination with the memory 830, in combination with the transceiver 820

(e.g., a wired receiver and/or a wireless receiver and an antenna) may comprise means for receiving updated locations of the plurality of anchor devices. The processor 810, possibly in combination with the memory 830, may comprise means for determining whether to modify membership of the anchor group, means for determining an updated transient property of the anchor group, and/or means for determining to terminate the anchor group.

Figure 11:
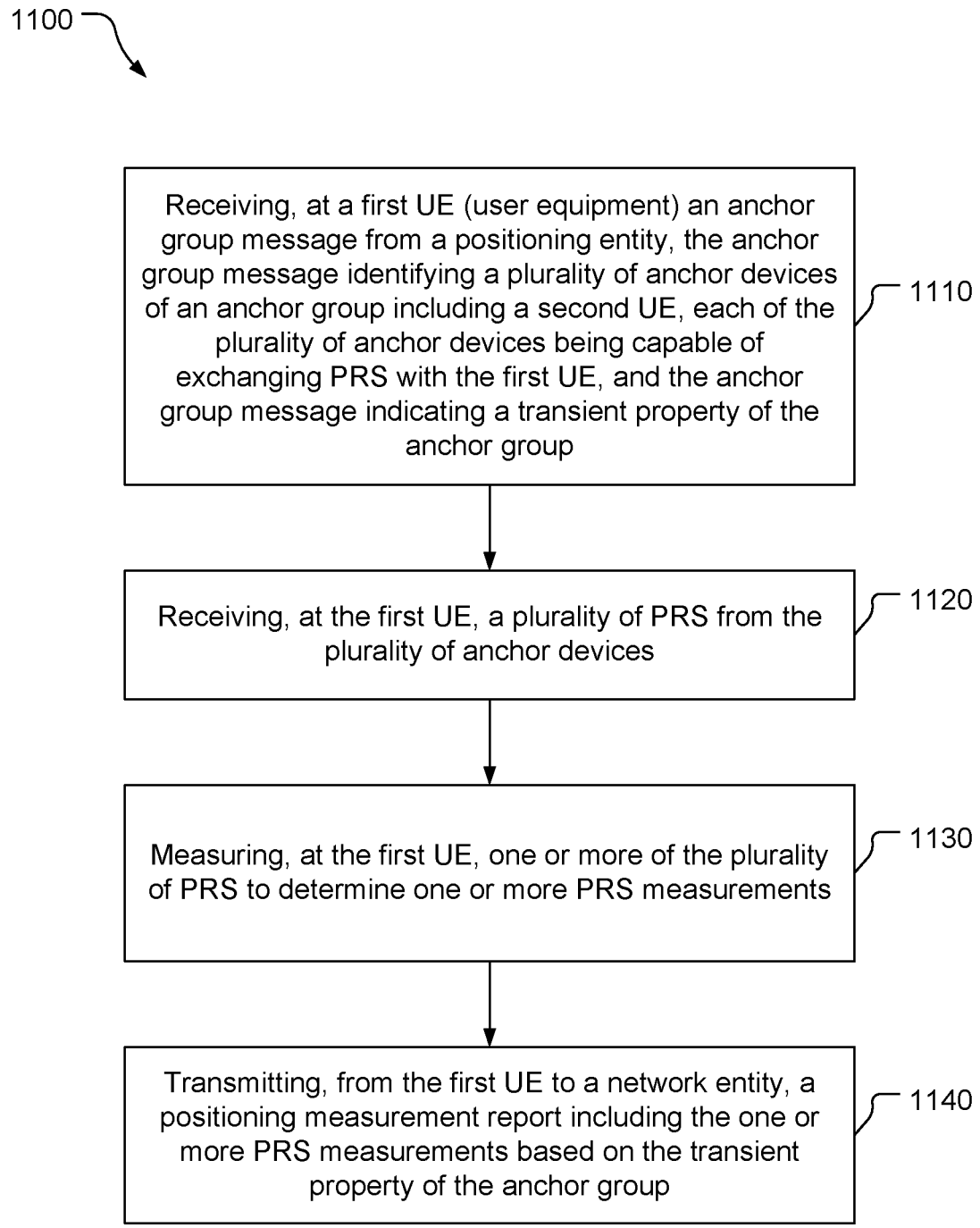
FIG. 11 is a block flow diagram of a positioning reference signal measurement reporting method.

Referring to FIG. 11, with further reference to FIGS. 1-9, a PRS measurement reporting method 1100 includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes receiving, an anchor group message at a first UE from a positioning entity, the anchor group message identifying a plurality of anchor devices of an anchor group including a second UE, each of the plurality of anchor devices being capable of exchanging PRS with the first UE, and the anchor group message indicating a transient property of the anchor group. For example, the target UE 904 receives the AD 934 from the positioning entity 800, with the AD 934 indicating the anchors 901-903 in the anchor group 906. The processor 710, possibly in combination with the memory 730, in combination with the transceiver 720 (e.g., the antenna 246 and the wireless receiver 244) may comprise means for receiving the anchor group message.

At stage 1120, the method 1100 includes receiving, at the first UE, a plurality of PRS from the plurality of anchor devices. For example, the target UE 904 receives the PRS 941-943 from the anchors 901-903. The processor 710, possibly in combination with the memory 730, in combination with the transceiver 720 (e.g., the antenna 246 and the wireless receiver 244) may comprise means for receiving the plurality of PRS.

At stage 1130, the method 1100 includes measuring, at the first UE, one or more of the plurality of PRS to determine one or more PRS measurements. For example, at stage 950, the target UE 904 measures one or more of the PRS 941-943, possibly selectively measuring the PRS as discussed with respect to stage 950. The processor 710, possibly in combination with the memory 730, may comprise means for measuring one or more of the plurality of PRS.

At stage 1140, the method 1100 includes transmitting, from the first UE to a network entity, a positioning measurement report including the one or more PRS measurements based on the transient property of the anchor group. For example, the target UE 904 transmits the measurement report 964 to the network entity 905. The measurement report 964 includes one or more PRS measurements based on the transient property of the anchor group. For example, the measurement(s) may be reported based on an expiration time having not passed (e.g., a time of day not yet passed or an amount of time not yet elapsed). As another example, which measurement(s) is(are) reported may be based on a mobility status of one or more members of the anchor group (e.g., whether stationary, relative motion of members, etc.). The processor 710, possibly in combination with the memory 730, in combination with the transceiver 720 (e.g., the antenna 246 and the wireless transmitter 242) may comprise means for transmitting the positioning measurement report.

Implementations of the method 1100 may include one or more of the following features. In an example implementation, the one or more PRS measurements comprise two or more PRS measurements, the method 1100 includes determining a baseline measurement of the two or more PRS measurements based on relative mobility of each of the plurality of anchor devices corresponding to the two or more PRS measurements, and transmitting the positioning measurement report comprises transmitting the positioning measurement report with a first of the two or more PRS measurements being the baseline measurement and a second of the two or more PRS measurements being a differential measurement relative to the baseline measurement. For example, the position information reporting unit 760 selects a PRS measurement, from at least two PRS measurements, to use as a baseline measurement based on mobility of the anchors corresponding to the PRS measurements, and reports the PRS measurements, one as a baseline measurement and the other as a differential measurement relative to the baseline measurement, e.g., to save signaling overhead. The processor 710, possibly in combination with the memory 730, may comprise means for determining the baseline measurement. In another example implementation, the baseline measurement is of a first PRS, of the plurality of PRS, corresponding to a first anchor device of the plurality of anchor devices, and determining the baseline measurement comprises determining the baseline measurement based on the first anchor device being stationary. For example, the position information reporting unit 760 may use a measurement of a PRS from a stationary anchor, if available, as a baseline measurement, e.g., instead of a measurement of a PRS from an anchor in motion. In another example implementation, the baseline measurement is of a first PRS, of the plurality of PRS, corresponding to a first anchor device of the plurality of anchor devices, and determining the baseline measurement comprises determining the baseline measurement based on the first anchor device being more stationary than a second anchor device of the plurality of anchor devices corresponding to the differential measurement. For example, given two available PRS measurements of two PRS from two anchors in motion, the position information reporting unit 760 may use, as a baseline measurement, the measurement of the PRS that was transmitted by the anchor that is moving less (e.g., at a slower speed) and thus more stationary.

Also or alternatively, implementations of the method 1100 may include one or more of the following features. In an example implementation, transmitting the positioning measurement report comprises transmitting the positioning measurement report including the one or more PRS measurements based on relative mobility of each of the plurality of anchor devices according to a priority protocol indicated in a priority message received by the first UE. For example, the position information reporting unit 760 may determine which PRS measurement(s) to report based on a priority indicated by the AD 934 and/or by the AD 935. In another example implementation, the method 1100 includes measuring one or more of the plurality of PRS comprises measuring one or more of the plurality of PRS based on relative mobility of each of the plurality of anchor devices. For example, the PRS measurement unit 750 may determine which of the PRS 941-943 to measure based on movement of the anchors 901-903 relative to each other, e.g., to measure the PRS 941-943 from a stationary anchor instead of a PRS transmitted by an anchor that is moving. Thus, the PRS measurement unit 750 may determine which PRS to measure instead of measuring all of the PRS 941-943 and the position information reporting unit 760 determining which PRS measurements to report. This may help conserve power, e.g., by avoiding determining one or more PRS measurements that will not be reported. In another example implementation, the transient property is an expiration time and transmitting the positioning measurement report comprises transmitting the positioning measurement report based on lack of passage of the expiration time. For example, the expiration time may be a time of day or an amount of time, and the position information reporting unit 760 may transmit the measurement report 964 only if the time of day has not been reached, or the amount of time has not elapsed, depending on the form of the expiration time.

Figure 12:
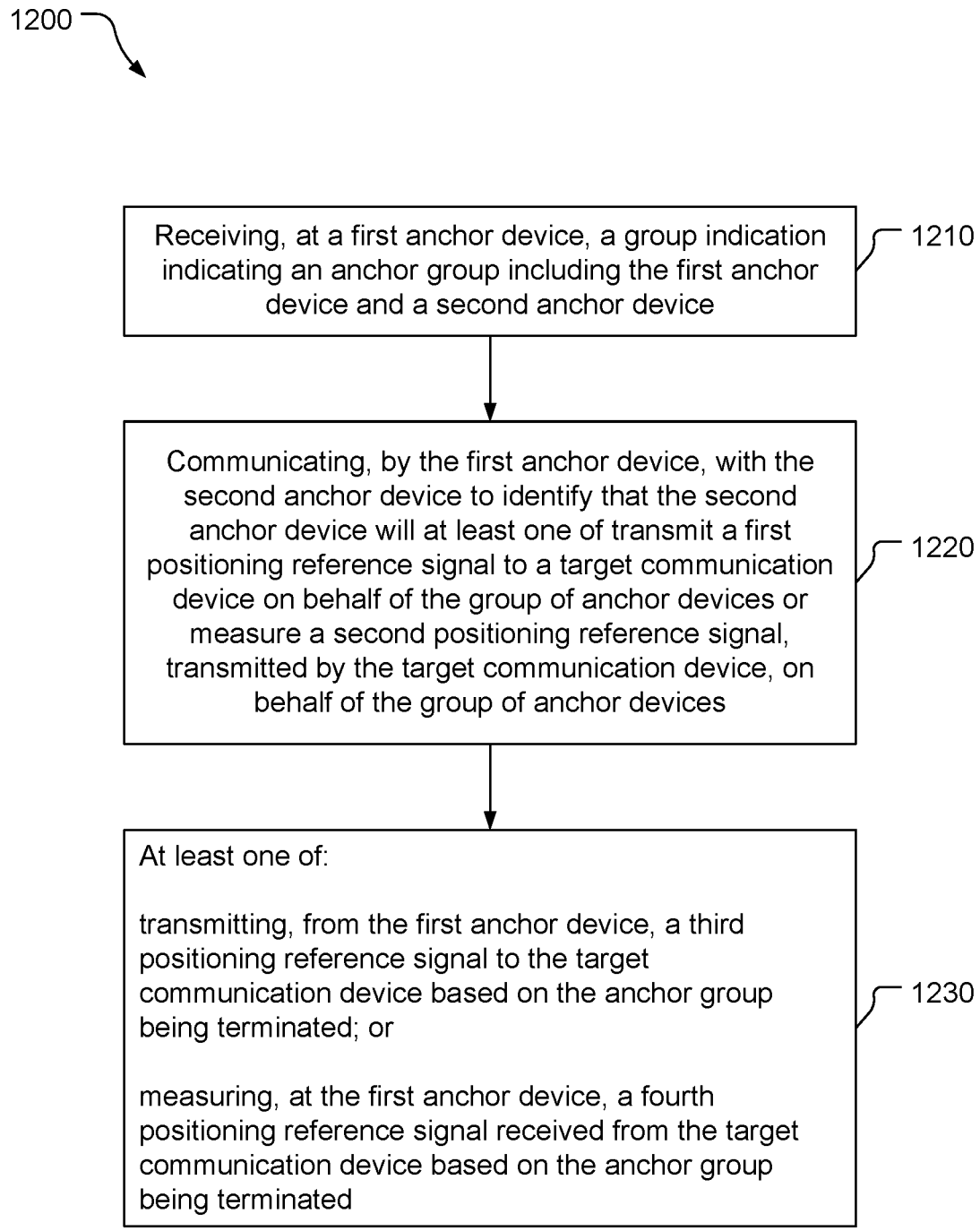
FIG. 12 is a block flow diagram of another positioning method.

Referring to FIG. 12, with reference to FIGS. 1-9, a positioning method 1200 includes the stages shown. The method 1200 is, however, an example only and not limiting. The method 1200 may be altered, e.g., by having stages added, removed, rearranged, combined, performed concurrently, and/or having single stages split into multiple stages.

At stage 1210, the method 1200 includes receiving, at a first anchor device, a group indication indicating an anchor group including the first anchor device and a second anchor device. For example, at stage 930 of the flow 900, the anchors 901-903 receive the AD 932 from the positioning entity 800 indicating the members of the anchor group 906. The processor 710, possibly in combination with the memory 730, in combination with the transceiver 710 (e.g., the wireless receiver 244 and the antenna 246) may comprise means for receiving a group indication indicating an anchor group. Also or alternatively, the processor 310, possibly in combination with the memory 311, in combination with the transceiver 315 (e.g., the wireless receiver 344 and the antenna 346, and/or the wired receiver 354) may comprise means for receiving a group indication indicating an anchor group.

At stage 1220, the method 1200 includes communicating, by the first anchor device, with the second anchor device to identify that the second anchor device will at least one of transmit a first positioning reference signal to a target communication device on behalf of the group of anchor devices or measure a second positioning reference signal, transmitted by the target communication device, on behalf of the group of anchor devices. For example, at sub-stage 933 of the flow 900, the anchors 901-903 communicate to coordinate the anchors 901-903 to act as a group, e.g., as a single apparatus to transmit PRS from a single one of the members of the anchor group 906 and/or to measure PRS from a target device (e.g., the target UE 904) by a single one of the members of the anchor group 906. The processor 710, possibly in combination with the memory 730, in combination with the transceiver 710 (e.g., the wireless transmitter 242, the wireless receiver 244, and the antenna 246 and/or the wired transmitter 252 and/or the wired receiver 254) may comprise means for communicating with the second anchor device. Also or alternatively, the processor 310, possibly in combination with the memory 311, in combination with the transceiver 315 (e.g., the wireless transmitter 342, the wireless receiver 344, and the antenna 346 and/or the wired transmitter 252 and/or the wired receiver 354) may comprise means for communicating with the second anchor device.

At stage 1230, the method 1200 includes at least one of: transmitting, from the first anchor device, a third positioning reference signal to the target communication device based on the anchor group being terminated; or measuring, at the first anchor device, a fourth positioning reference signal received from the target communication device based on the anchor group being terminated. For example, at stage 940, the anchor 902 transmits the PRS 942 to the target UE 904 and/or the anchor 902 receives and measures the PRS 944 transmitted by the anchor UE 904. The processor 710, possibly in combination with the memory 730, in combination with the transceiver 710 (e.g., the wireless transmitter 242 and the antenna 246 and/or the wired transmitter 252) may comprise means for transmitting the third PRS. Also or alternatively, the processor 310, possibly in combination with the memory 311, in combination with the transceiver 315 (e.g., the wireless transmitter 342 and the antenna 346 and/or the wired transmitter 252) may comprise means for transmitting the third PRS. The processor 710, possibly in combination with the memory 730, in combination with the transceiver 710 (e.g., the wireless receiver 244 and the antenna 246 and/or the wired receiver 254) may comprise means for measuring the fourth PRS. Also or alternatively, the processor 310, possibly in combination with the memory 311, in combination with the transceiver 315 (e.g., the wireless receiver 344 and the antenna 346 and/or the wired receiver 254) may comprise means for measuring the fourth PRS.

Implementations of the method 1200 may include one or more of the following features. In an example implementation, the group indication includes a validity condition for the anchor group, and the method 1200 further comprises determining that the anchor group is terminated in response to the validity condition changing from being valid to being invalid. For example, at stage 980, one or more of the anchors 901-903 determines that the anchor group 906 is terminated based on a validity condition for the anchor group 901-903 changing from valid to invalid. The processor 710, possibly in combination with the memory 730, possibly in combination with the transceiver 710 (e.g., the wireless receiver 244 and the antenna 246 and/or the wired receiver 254) may comprise means for determining that the anchor group is terminated. Also or alternatively, the processor 310, possibly in combination with the memory 311, in combination with the transceiver 315 (e.g., the wireless receiver 344 and the antenna 346 and/or the wired receiver 254) may comprise means for determining that the anchor group is terminated. In another example implementation, the validity condition is an indication of a validity expiration time, and determining that the anchor group is terminated comprises determining that the anchor group is terminated based on passage of the validity expiration time. For example, one or more of the anchors 901-903 may determine that the anchor group is terminated based on a time of day passing or an amount of time passing (e.g., since the anchor group 906 was formed). In another example implementation, the method 1200 comprises further comprising determining that the anchor group is terminated based on receipt of an anchor group termination indication. For example, one or more of the anchors 901-903 may receive an anchor group termination message, indicating termination of the anchor group 906, from the positioning entity 800 and/or another one of the members of the anchor group 906 and determine to terminate the anchor group 906 based on receipt of the anchor group termination message. The processor 710, possibly in combination with the memory 730, in combination with the transceiver 710 (e.g., the wireless receiver 244 and the antenna 246 and/or the wired receiver 254) may comprise means for determining that the anchor group is terminated. Also or alternatively, the processor 310, possibly in combination with the memory 311, in combination with the transceiver 315 (e.g., the wireless receiver 344 and the antenna 346 and/or the wired receiver 254) may comprise means for determining that the anchor group is terminated.

Implementation Examples

Implementation examples are provided in the following numbered clauses.

1. A positioning entity comprising:
means for identifying a plurality of anchor devices of an anchor group, including a first UE (user equipment), based on a geographic similarity of the plurality of anchor devices, each of the plurality of anchor devices being capable of exchanging PRS (positioning reference signal(s)) with a second UE; and
means for transmitting an anchor group message to the second UE, the anchor group message identifying the plurality of anchor devices and indicating a transient property of the anchor group.

2. The positioning entity of clause 1, wherein the transient property of the anchor group is an expiration time of the anchor group.

3. The positioning entity of clause 2, further comprising means for determining the expiration time of the anchor group based on motion of the first UE relative to an other member of the anchor group.

4. The positioning entity of clause 3, wherein the means for determining the expiration time comprise means for determining the expiration time of the anchor group based on a predicted time that the first UE and the other member of the anchor group will fail to meet at least one criterion for being considered to be geographically similar.

5. The positioning entity of clause 1, wherein the transient property of the anchor group is a mobility status of at least the first UE.

6. The positioning entity of clause 5, wherein the mobility status indicates whether the first UE is presently in motion.

7. The positioning entity of clause 5, wherein the mobility status indicates which of the plurality of anchor devices of the anchor group are presently stationary.

8. The positioning entity of clause 1, further comprising:
means for receiving updated locations of the plurality of anchor devices of the anchor group; and
at least one of:
means for determining whether to modify membership of the anchor group based on the updated locations; or
means for determining an updated transient property of the anchor group based on the updated locations and transmitting the updated transient property to the second UE; or
means for terminating the anchor group based on the updated locations.

9. A non-transitory, processor-readable storage medium comprising processor-readable instructions to cause a processor of a positioning entity to:
identify a plurality of anchor devices of an anchor group, including a first UE (user equipment), based on a geographic similarity of the plurality of anchor devices, each of the plurality of anchor devices being capable of exchanging PRS (positioning reference signal(s)) with a second UE; and
transmit an anchor group message to the second UE, the anchor group message identifying the plurality of anchor devices and indicating a transient property of the anchor group.

10. The storage medium of clause 9, wherein the transient property of the anchor group is an expiration time of the anchor group.

11. The storage medium of clause 10, further comprising processor-readable instructions to cause the processor to determine the expiration time of the anchor group based on motion of the first UE relative to an other member of the anchor group.

12. The storage medium of clause 11, wherein the processor-readable instructions to cause the processor to determine the expiration time comprise processor-readable instructions to cause the processor to determine the expiration time of the anchor group based on a predicted time that the first UE and the other member of the anchor group will fail to meet at least one criterion for being considered to be geographically similar.

13. The storage medium of clause 9, wherein the transient property of the anchor group is a mobility status of at least the first UE.

14. The storage medium of clause 13, wherein the mobility status indicates whether the first UE is presently in motion.

15. The storage medium of clause 13, wherein the mobility status indicates which of the plurality of anchor devices of the anchor group are presently stationary.

16. The storage medium of clause 9, further comprising processor-readable instructions to cause the processor to:
receive updated locations of the plurality of anchor devices of the anchor group; and
at least one of:
determine whether to modify membership of the anchor group based on the updated locations; or
determine an updated transient property of the anchor group based on the updated locations and transmit the updated transient property to the second UE; or
terminate the anchor group based on the updated locations.

17. A first UE (user equipment) comprising:
means for receiving an anchor group message from a positioning entity, the anchor group message identifying a plurality of anchor devices of an anchor group including a second UE, each of the plurality of anchor devices being capable of exchanging PRS (positioning reference signal(s)) with the first UE, and the anchor group message indicating a transient property of the anchor group;
means for receiving a plurality of PRS from the plurality of anchor devices;
means for measuring one or more of the plurality of PRS to determine one or more PRS measurements; and
means for transmitting, to a network entity, a positioning measurement report including the one or more PRS measurements based on the transient property of the anchor group.

18. The first UE of clause 17, wherein the one or more PRS measurements comprise two or more PRS measurements, wherein the first UE further comprises means for determining a baseline measurement of the two or more PRS measurements based on relative mobility of each of the plurality of anchor devices corresponding to the two or more PRS measurements, and the means for transmitting the positioning measurement report comprise means for transmitting the positioning measurement report with a first of the two or more PRS measurements being the baseline measurement and a second of the two or more PRS measurements being a differential measurement relative to the baseline measurement.

19. The first UE of clause 18, wherein the baseline measurement is of a first PRS, of the plurality of PRS, corresponding to a first anchor device of the plurality of anchor devices, and wherein the means for determining the baseline measurement comprise means for determining the baseline measurement based on the first anchor device being stationary.

20. The first UE of clause 18, wherein the baseline measurement is of a first PRS, of the plurality of PRS, corresponding to a first anchor device of the plurality of anchor devices, and wherein the means for determining the baseline measurement comprise means for determining the baseline measurement based on the first anchor device being more stationary than a second anchor device of the plurality of anchor devices corresponding to the differential measurement.

21. The first UE of clause 17, wherein the means for transmitting the positioning measurement report comprise means for transmitting the positioning measurement report including the one or more PRS measurements based on relative mobility of each of the plurality of anchor devices according to a priority protocol indicated in a priority message received by the first UE.

22. The first UE of clause 17, wherein the means for measuring one or more of the plurality of PRS comprise means for measuring one or more of the plurality of PRS based on relative mobility of each of the plurality of anchor devices.

23. The first UE of clause 17, wherein the transient property is an expiration time and the means for transmitting the positioning measurement report comprise means for transmitting the positioning measurement report based on lack of passage of the expiration time.

24. A non-transitory, processor-readable storage medium comprising processor-readable instructions to cause a processor of a first UE (user equipment) to:
receive an anchor group message from a positioning entity, the anchor group message identifying a plurality of anchor devices of an anchor group including a second UE, each of the plurality of anchor devices being capable of exchanging PRS (positioning reference signal(s)) with the first UE, and the anchor group message indicating a transient property of the anchor group;
receive a plurality of PRS from the plurality of anchor devices;
measure one or more of the plurality of PRS to determine one or more PRS measurements; and
transmit, to a network entity, a positioning measurement report including the one or more PRS measurements based on the transient property of the anchor group.

25. The storage medium of clause 24, wherein the one or more PRS measurements comprise two or more PRS measurements, wherein the storage medium further comprises processor-readable instructions to cause the processor to determine a baseline measurement of the two or more PRS measurements based on relative mobility of each of the plurality of anchor devices corresponding to the two or more PRS measurements, and the processor-readable instructions to cause the processor to transmit the positioning measurement report comprise processor-readable instructions to cause the processor to transmit the positioning measurement report with a first of the two or more PRS measurements being the baseline measurement and a second of the two or more PRS measurements being a differential measurement relative to the baseline measurement.

26. The storage medium of clause 25, wherein the baseline measurement is of a first PRS, of the plurality of PRS, corresponding to a first anchor device of the plurality of anchor devices, and wherein the processor-readable instructions to cause the processor to determine the baseline measurement comprise processor-readable instructions to cause the processor to determine the baseline measurement based on the first anchor device being stationary.

27. The storage medium of clause 25, wherein the baseline measurement is of a first PRS, of the plurality of PRS, corresponding to a first anchor device of the plurality of anchor devices, and wherein the processor-readable instructions to cause the processor to determine the baseline measurement comprise processor-readable instructions to cause the processor to determine the baseline measurement based on the first anchor device being more stationary than a second anchor device of the plurality of anchor devices corresponding to the differential measurement.

28. The storage medium of clause 24, wherein the processor-readable instructions to cause the processor to transmit the positioning measurement report comprise processor-readable instructions to cause the processor to transmit the positioning measurement report including the one or more PRS measurements based on relative mobility of each of the plurality of anchor devices according to a priority protocol indicated in a priority message received by the first UE.

29. The storage medium of clause 24, wherein the processor-readable instructions to cause the processor to measure one or more of the plurality of PRS comprise processor-readable instructions to cause the processor to measure one or more of the plurality of PRS based on relative mobility of each of the plurality of anchor devices.

30. The storage medium of clause 24, wherein the transient property is an expiration time and the processor-readable instructions to cause the processor to transmit the positioning measurement report comprise processor-readable instructions to cause the processor to transmit the positioning measurement report based on lack of passage of the expiration time.

31. A first anchor device comprising:
a transceiver;
a memory; and
a processor, communicatively coupled to the transceiver and the memory, configured to:
receive, via the transceiver, a group indication indicating an anchor group including the first anchor device and a second anchor device;
communicate, via the transceiver, with the second anchor device to identify that the second anchor device will at least one of transmit a first positioning reference signal to a target communication device on behalf of the anchor group or measure a second positioning reference signal, transmitted by the target communication device, on behalf of the anchor group; and
at least one of:
transmit a third positioning reference signal to the target communication device via the transceiver based on the anchor group being terminated; or
measure a fourth positioning reference signal received from the target communication device based on the anchor group being terminated.

32. The first anchor device of clause 31, wherein the group indication includes a validity condition for the anchor group and the processor is further configured to determine that the anchor group is terminated in response to the validity condition changing from being valid to being invalid.

33. The first anchor device of clause 32, wherein the validity condition is an indication of a validity expiration time, and the processor is configured to determine that the anchor group is terminated based on passage of the validity expiration time.

34. The first anchor device of clause 31, wherein the processor is further configured to determine that the anchor group is terminated based on receipt, via the transceiver, of an anchor group termination indication.

35. A first anchor device comprising:
  means for receiving a group indication indicating an anchor group including the first anchor device and a second anchor device;
  means for communicating with the second anchor device to identify that the second anchor device will at least one of transmit a first positioning reference signal to a target communication device on behalf of the anchor group or measure a second positioning reference signal, transmitted by the target communication device, on behalf of the anchor group; and
  at least one of:
    means for transmitting a third positioning reference signal to the target communication device based on the anchor group being terminated; or
    means for measuring a fourth positioning reference signal received from the target communication device based on the anchor group being terminated.

36. The first anchor device of clause 35, wherein the group indication includes a validity condition for the anchor group, and the first anchor device further comprises means for determining that the anchor group is terminated in response to the validity condition changing from being valid to being invalid.

37. The first anchor device of clause 36, wherein the validity condition is an indication of a validity expiration time, and the means for determining that the anchor group is terminated comprises means for determining that the anchor group is terminated based on passage of the validity expiration time.

38. The first anchor device of clause 35, further comprising means for determining that the anchor group is terminated based on receipt of an anchor group termination indication.

39. A positioning method comprising:
  receiving, at a first anchor device, a group indication indicating an anchor group including the first anchor device and a second anchor device;
  communicating, by the first anchor device, with the second anchor device to identify that the second anchor device will at least one of transmit a first positioning reference signal to a target communication device on behalf of the anchor group or measure a second positioning reference signal, transmitted by the target communication device, on behalf of the anchor group; and
  at least one of:
    transmitting, from the first anchor device, a third positioning reference signal to the target communication device based on the anchor group being terminated; or
    measuring, at the first anchor device, a fourth positioning reference signal received from the target communication device based on the anchor group being terminated.

40. The positioning method of clause 39, wherein the group indication includes a validity condition for the anchor group, and the positioning method further comprises determining that the anchor group is terminated in response to the validity condition changing from being valid to being invalid.

41. The positioning method of clause 40, wherein the validity condition is an indication of a validity expiration time, and determining that the anchor group is terminated comprises determining that the anchor group is terminated based on passage of the validity expiration time.

42. The positioning method of clause 39, further comprising determining that the anchor group is terminated based on receipt of an anchor group termination indication.

43. A non-transitory, processor-readable storage medium comprising processor-readable instructions to cause a processor of a first anchor device to:
  receive a group indication indicating an anchor group including the first anchor device and a second anchor device;
  communicate with the second anchor device to identify that the second anchor device will at least one of transmit a first positioning reference signal to a target communication device on behalf of the anchor group or measure a second positioning reference signal, transmitted by the target communication device, on behalf of the anchor group; and
  at least one of:
    transmit a third positioning reference signal to the target communication device based on the anchor group being terminated; or
    measure a fourth positioning reference signal received from the target communication device based on the anchor group being terminated.

44. The storage medium of clause 43, wherein the group indication includes a validity condition for the anchor group, and the processor-readable instructions further comprise processor-readable instructions to cause the processor to determine that the anchor group is terminated in response to the validity condition changing from being valid to being invalid.

45. The storage medium of clause 44, wherein the validity condition is an indication of a validity expiration time, and the processor-readable instructions to cause the processor to determine that the anchor group is terminated comprise processor-readable instructions to cause the processor to determine that the anchor group is terminated based on passage of the validity expiration time.

46. The storage medium of clause 43, further comprising processor-readable instructions to cause the processor to determine that the anchor group is terminated based on receipt of an anchor group termination indication.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:
1. A positioning entity comprising:
a transceiver;
a memory; and
a processor, communicatively coupled to the transceiver and the memory, configured to:
identify a plurality of anchor devices of an anchor group, including a first UE (user equipment), based on a geographic similarity of the plurality of anchor devices, each of the plurality of anchor devices being capable of exchanging PRS (positioning reference signal(s)) with a second UE; and transmit an anchor group message via the transceiver to the second UE, the anchor group message identifying the plurality of anchor devices and indicating a transient property of the anchor group, the transient property of the anchor group being a mobility status of at least the first UE.

2. The positioning entity of claim 1, wherein the mobility status indicates whether the first UE is presently in motion.

3. The positioning entity of claim 1, wherein the mobility status indicates which of the plurality of anchor devices of the anchor group are presently stationary.

4. The positioning entity of claim 1, wherein the processor is further configured to:
receive updated locations of the plurality of anchor devices of the anchor group; and
at least one of:
determine whether to modify membership of the anchor group based on the updated locations; or
determine an updated transient property of the anchor group based on the updated locations and transmit the updated transient property via the transceiver to the second UE; or
terminate the anchor group based on the updated locations.

5. A positioning entity comprising:
a transceiver;
a memory; and
a processor, communicatively coupled to the transceiver and the memory, configured to:
identify a plurality of anchor devices of an anchor group, including a first UE (user equipment), based on a geographic similarity of the plurality of anchor devices, each of the plurality of anchor devices being capable of exchanging PRS (positioning reference signal(s)) with a second UE; and
transmit an anchor group message via the transceiver to the second UE, the anchor group message identifying the plurality of anchor devices and indicating a transient property of the anchor group;
wherein the transient property of the anchor group is an expiration time of the anchor group; and
wherein the processor is configured to determine the expiration time of the anchor group based on motion of the first UE relative to another member of the anchor group.

6. The positioning entity of claim 5, wherein the processor is configured to determine the expiration time of the anchor group based on a predicted time that the first UE and the other member of the anchor group will fail to meet at least one criterion for being considered to be geographically similar.

7. A positioning method comprising:
identifying a plurality of anchor devices of an anchor group, including a first UE (user equipment), based on a geographic similarity of the plurality of anchor devices, each of the plurality of anchor devices being capable of exchanging PRS (positioning reference signal(s)) with a second UE; and
transmitting an anchor group message to the second UE, the anchor group message identifying the plurality of anchor devices and indicating a transient property of the anchor group, the transient property of the anchor group being a mobility status of at least the first UE.

8. The method of claim 7, wherein the mobility status indicates whether the first UE is presently in motion.

9. The method of claim 7, wherein the mobility status indicates which of the plurality of anchor devices of the anchor group are presently stationary.

10. The positioning method of claim 7, further comprising:
receiving updated locations of the plurality of anchor devices of the anchor group; and
at least one of:
determining whether to modify membership of the anchor group based on the updated locations; or
determining an updated transient property of the anchor group based on the updated locations and transmitting the updated transient property to the second UE; or
terminating the anchor group based on the updated locations.

11. A positioning method comprising:
identifying a plurality of anchor devices of an anchor group, including a first UE (user equipment), based on a geographic similarity of the plurality of anchor devices, each of the plurality of anchor devices being capable of exchanging PRS (positioning reference signal(s)) with a second UE;
transmitting an anchor group message to the second UE, the anchor group message identifying the plurality of anchor devices and indicating a transient property of the anchor group, the transient property of the anchor group being an expiration time of the anchor group; and
determining the expiration time of the anchor group based on motion of the first UE relative to an other member of the anchor group.

12. The method of claim 11, wherein determining the expiration time comprises determining the expiration time of the anchor group based on a predicted time that the first UE and the other member of the anchor group will fail to meet at least one criterion for being considered to be geographically similar.

13. A first UE (user equipment) comprising:
a transceiver;
a memory; and
a processor, communicatively coupled to the transceiver and the memory, configured to:
receive an anchor group message via the transceiver from a positioning entity, the anchor group message identifying a plurality of anchor devices of an anchor group including a second UE, each of the plurality of anchor devices being capable of exchanging PRS (positioning reference signal(s)) with the first UE, and the anchor group message indicating a transient property of the anchor group;
receive a plurality of PRS from the plurality of anchor devices;
measure one or more of the plurality of PRS to determine one or more PRS measurements; and
transmit, via the transceiver to a network entity, a positioning measurement report including the one or more PRS measurements based on the transient property of the anchor group, the transient property of the anchor group being a mobility status of at least the second UE.

14. The first UE of claim 13, wherein the processor is configured to transmit the positioning measurement report including the one or more PRS measurements based on relative mobility of each of the plurality of anchor devices according to a priority protocol indicated in a priority message received via the transceiver.

15. The first UE of claim 13, wherein the processor is configured to make the one or more PRS measurements based on relative mobility of each of the plurality of anchor devices.

16. A first UE (user equipment) comprising:
 a transceiver;
 a memory; and
 a processor, communicatively coupled to the transceiver and the memory, configured to:
  receive an anchor group message via the transceiver from a positioning entity, the anchor group message identifying a plurality of anchor devices of an anchor group including a second UE, each of the plurality of anchor devices being capable of exchanging PRS (positioning reference signal(s)) with the first UE, and the anchor group message indicating a transient property of the anchor group;
  receive a plurality of PRS from the plurality of anchor devices;
  measure one or more of the plurality of PRS to determine one or more PRS measurements; and
  transmit, via the transceiver to a network entity, a positioning measurement report including the one or more PRS measurements based on the transient property of the anchor group;
 wherein the one or more PRS measurements comprise two or more PRS measurements, and wherein the processor is further configured to:
  determine a baseline measurement of the two or more PRS measurements based on relative mobility of each of the plurality of anchor devices corresponding to the two or more PRS measurements; and
  transmit the positioning measurement report with a first of the two or more PRS measurements being the baseline measurement and a second of the two or more PRS measurements being a differential measurement relative to the baseline measurement.

17. The first UE of claim 16, wherein the baseline measurement is of a first PRS, of the plurality of PRS, corresponding to a first anchor device of the plurality of anchor devices, and wherein the processor is configured to determine the baseline measurement based on the first anchor device being stationary.

18. The first UE of claim 16, wherein the baseline measurement is of a first PRS, of the plurality of PRS, corresponding to a first anchor device of the plurality of anchor devices, and wherein the processor is configured to determine the baseline measurement based on the first anchor device being more stationary than a second anchor device of the plurality of anchor devices corresponding to the differential measurement.

19. A first UE (user equipment) comprising:
 a transceiver;
 a memory; and
 a processor, communicatively coupled to the transceiver and the memory, configured to:
  receive an anchor group message via the transceiver from a positioning entity, the anchor group message identifying a plurality of anchor devices of an anchor group including a second UE, each of the plurality of anchor devices being capable of exchanging PRS (positioning reference signal(s)) with the first UE, and the anchor group message indicating a transient property of the anchor group;
  receive a plurality of PRS from the plurality of anchor devices;
  measure one or more of the plurality of PRS to determine one or more PRS measurements; and
  transmit, via the transceiver to a network entity, a positioning measurement report including the one or more PRS measurements based on the transient property of the anchor group;
 wherein the transient property is an expiration time and the processor is configured to transmit the positioning measurement report based on lack of passage of the expiration time.

20. A PRS (positioning reference signal(s)) measurement reporting method comprising:
 receiving, an anchor group message at a first UE (user equipment) from a positioning entity, the anchor group message identifying a plurality of anchor devices of an anchor group including a second UE, each of the plurality of anchor devices being capable of exchanging PRS with the first UE, and the anchor group message indicating a transient property of the anchor group;
 receiving, at the first UE, a plurality of PRS from the plurality of anchor devices;
 measuring, at the first UE, one or more of the plurality of PRS to determine one or more PRS measurements; and
 transmitting, from the first UE to a network entity, a positioning measurement report including the one or more PRS measurements based on the transient property of the anchor group, the transient property of the anchor group being a mobility status of at least the second UE.

21. The method of claim 20, wherein transmitting the positioning measurement report comprises transmitting the positioning measurement report including the one or more PRS measurements based on relative mobility of each of the plurality of anchor devices according to a priority protocol indicated in a priority message received by the first UE.

22. The method of claim 20, wherein measuring one or more of the plurality of PRS comprises measuring one or more of the plurality of PRS based on relative mobility of each of the plurality of anchor devices.

23. A PRS (positioning reference signal(s)) measurement reporting method comprising:
 receiving, an anchor group message at a first UE (user equipment) from a positioning entity, the anchor group message identifying a plurality of anchor devices of an anchor group including a second UE, each of the plurality of anchor devices being capable of exchanging PRS with the first UE, and the anchor group message indicating a transient property of the anchor group;
 receiving, at the first UE, a plurality of PRS from the plurality of anchor devices;
 measuring, at the first UE, one or more of the plurality of PRS to determine one or more PRS measurements; and
 transmitting, from the first UE to a network entity, a positioning measurement report including the one or more PRS measurements based on the transient property of the anchor group;
 wherein the one or more PRS measurements comprise two or more PRS measurements, wherein the method further comprises determining a baseline measurement of the two or more PRS measurements based on relative mobility of each of the plurality of anchor devices corresponding to the two or more PRS measurements, and transmitting the positioning measurement report comprises transmitting the positioning measurement report with a first of the two or more PRS measurements being the baseline measurement and a second of the two or more PRS measurements being a differential measurement relative to the baseline measurement.

24. The method of claim 23, wherein the baseline measurement is of a first PRS, of the plurality of PRS, corresponding to a first anchor device of the plurality of anchor devices, and wherein determining the baseline measurement comprises determining the baseline measurement based on the first anchor device being stationary.

25. The method of claim 23, wherein the baseline measurement is of a first PRS, of the plurality of PRS, corresponding to a first anchor device of the plurality of anchor devices, and wherein determining the baseline measurement comprises determining the baseline measurement based on the first anchor device being more stationary than a second anchor device of the plurality of anchor devices corresponding to the differential measurement.

26. A PRS (positioning reference signal(s)) measurement reporting method comprising:

receiving, an anchor group message at a first UE (user equipment) from a positioning entity, the anchor group message identifying a plurality of anchor devices of an anchor group including a second UE, each of the plurality of anchor devices being capable of exchanging PRS with the first UE, and the anchor group message indicating a transient property of the anchor group;

receiving, at the first UE, a plurality of PRS from the plurality of anchor devices;

measuring, at the first UE, one or more of the plurality of PRS to determine one or more PRS measurements; and transmitting, from the first UE to a network entity, a positioning measurement report including the one or more PRS measurements based on the transient property of the anchor group;

wherein the transient property is an expiration time and transmitting the positioning measurement report comprises transmitting the positioning measurement report based on lack of passage of the expiration time.

* * * * *